United States Patent [19]

Shintani et al.

[11] Patent Number: 4,532,589
[45] Date of Patent: Jul. 30, 1985

[54] DIGITAL DATA PROCESSOR WITH TWO OPERATION UNITS

[75] Inventors: Yoichi Shintani, Kokubunji; Kenichi Wada, Zama; Tsuguo Shimizu, Sayama; Akira Yamaoka, Hadano, all of Japan

[73] Assignee: Hitachi, Ltd., Tokyo, Japan

[21] Appl. No.: 446,002

[22] Filed: Dec. 1, 1982

[30] Foreign Application Priority Data

Dec. 2, 1981 [JP] Japan .................. 56-194001
Dec. 2, 1981 [JP] Japan .................. 56-194002

[51] Int. Cl.³ .................. G06F 9/38; G06F 9/00
[52] U.S. Cl. .................. 364/200
[58] Field of Search ... 364/200 MS File, 900 MS File

[56] References Cited

U.S. PATENT DOCUMENTS

| 4,110,822 | 8/1978 | Porter et al. | 364/200 |
| 4,200,927 | 4/1980 | Hughes et al. | 364/200 |
| 4,251,859 | 2/1981 | Momose | 364/200 |
| 4,270,181 | 5/1981 | Tanakura et al. | 364/200 X |
| 4,305,124 | 12/1981 | Marro et al. | 364/200 |

*Primary Examiner*—James D. Thomas
*Assistant Examiner*—William G. Niessen
*Attorney, Agent, or Firm*—Antonelli, Terry & Wands

[57] ABSTRACT

In a data processing apparatus executing a plurality of instructions in a pipeline mode by dividing each of the instructions into a plurality of stages, its operation circuit includes a first execution (E) unit capable of execution of operations required by all of the plural instructions and a second E unit capable of execution of operations required by part of the plural instructions only. A queue of data including decoded information of the instructions required for execution of operation stages are stored in a circuit to be selectively supplied by first and second circuits to the first and second E units, respectively. The first and second circuits sequentially select succeeding data in synchronism with the end of operations in the first and second E units respectively. As a result, when a stage of a succeeding instruction requires the result of operation of a preceding instruction being executed, that stage of the succeeding instruction is executed after the second E unit completes the operation of the preceding instruction, even when the first E unit is executing an instruction further preceding the preceding instruction.

3 Claims, 16 Drawing Figures

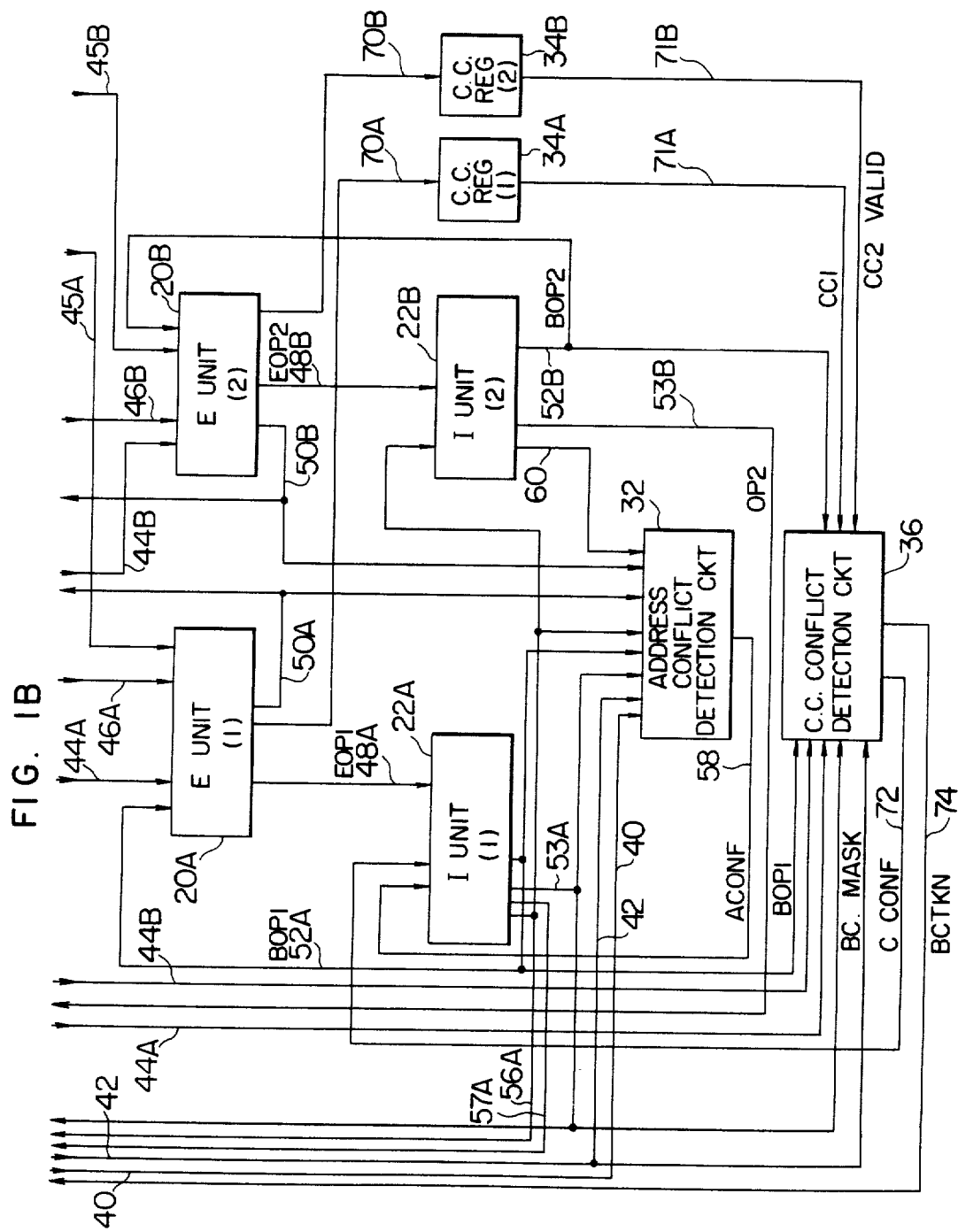

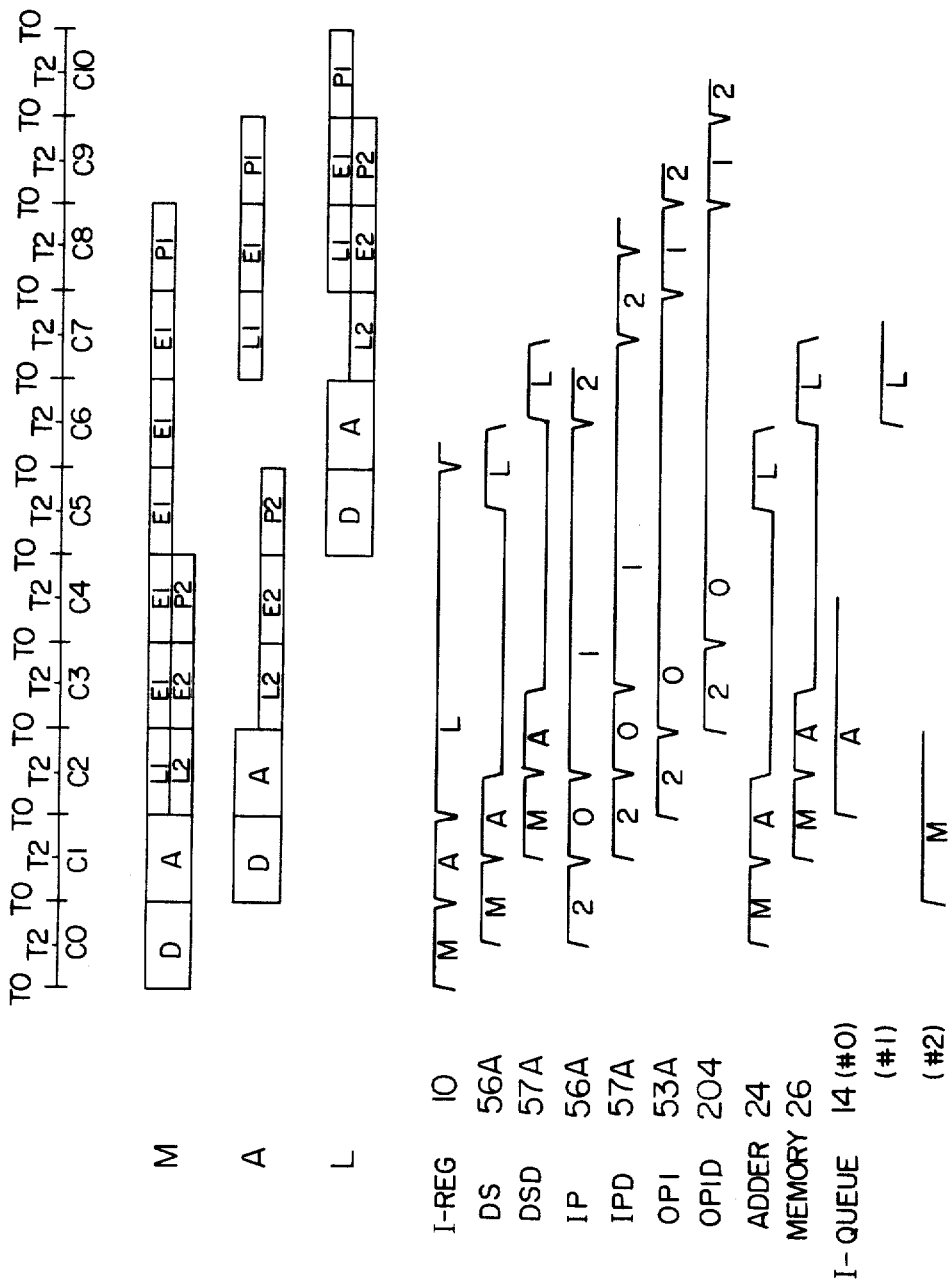

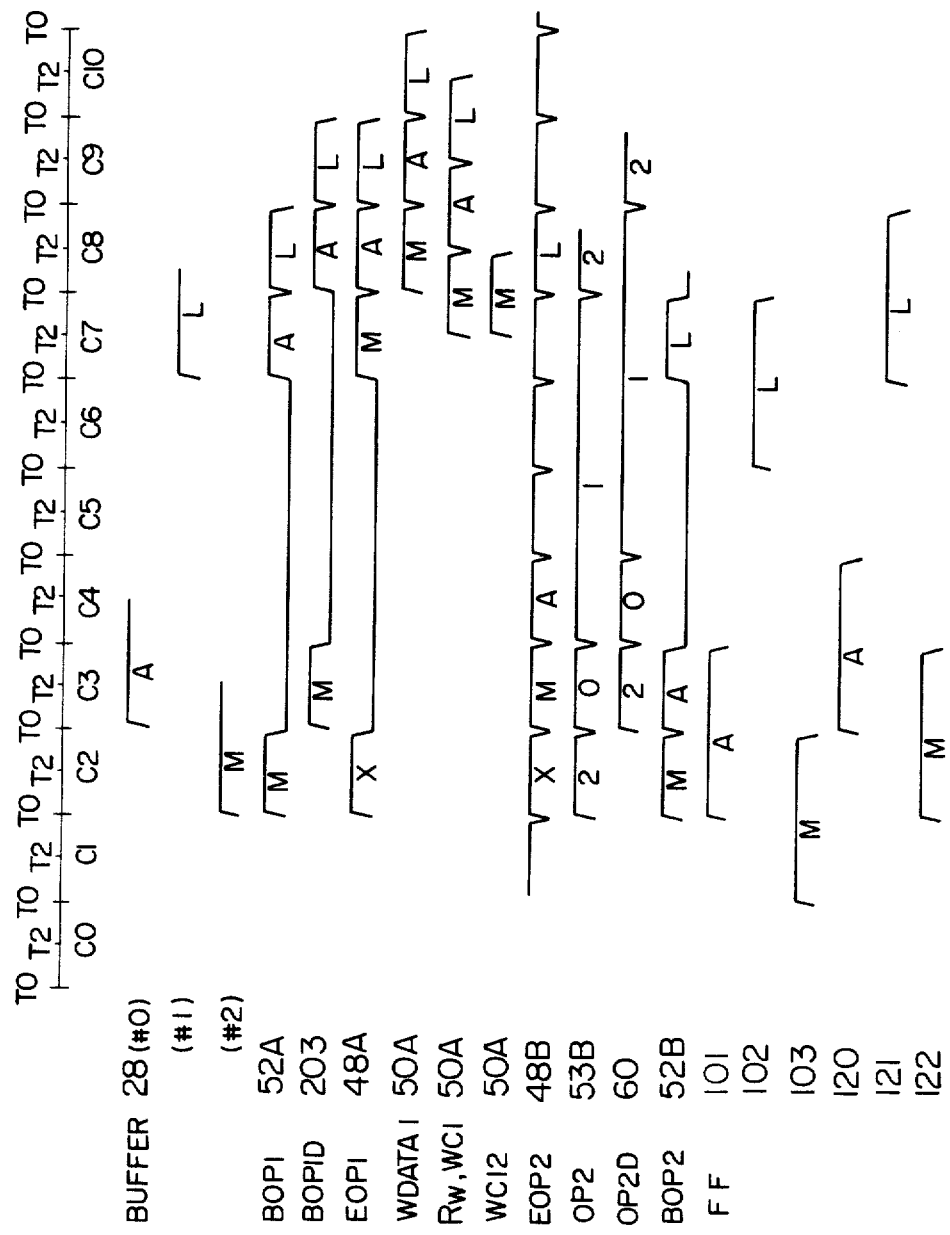

DIGITAL DATA PROCESSOR WITH TWO OPERATION UNITS

BACKGROUND OF THE INVENTION

This invention relates to a digital computer of the type executing instructions in a pipeline mode.

In a digital computer of the type which is capable of above described, each of a plurality of instructions is divided into a plurality of stages, and different stages of different instructions are executed in parallel, so that the plural instructions can be executed substantially in parallel relation.

However, when data required for processing according to an instruction B is obtained utilizing the result of operation specified by a preceding instruction A, execution of the instruction B must be deferred until the result of operation specified by the instruction A is established. Such a situation occurs in, for example, the case in which the contents of a base register or an index register are updated or renewed as a result of execution of the instruction A, and the new contents of the base register or index register are added to the address information included in the instruction B by execution of the instruction B so as to calculate the absolute address for access to a main memory. Thus, under such a situation, the result of operation according to the instruction A must be used for the execution of the instruction B. Occurrence of such a situation will be called hereinafter the presence of an address conflict. In such a case, execution of the address calculation stage of the instruction B is deferred until the operation of the instruction A is completed.

In order to minimize this delay, a secondary execution unit which can execute only simple operations required by part of the instructions has hitherto been provided separately from a primary execution unit which can execute operations required by all of the instructions. Such a secondary execution unit of relatively simple construction is generally disposed near the general register including the base register or the index register, and the primary execution unit of complex construction, hence, of larger circuit scale is disposed remote from the general register relative to the secondary execution unit. Operations that can be executed by either of the primary execution unit and secondary execution unit are executed by both of these execution units. When, for example, the instruction A above described requires an operation using only the data stored in the general register, this operation is executed by both of the primary execution unit and the secondary execution unit. When the primary execution unit and the secondary execution unit are simultaneously actuated or placed in operation, the operand required for the operation is supplied to the secondary execution unit earlier than the primary execution unit, and, therefore, the secondary execution unit generates the result of operation earlier than the primary execution unit, due to the fact that the secondary execution unit is disposed nearer to the general register than the primary execution unit. Therefore, by using the output from the secondary execution unit for the address calculation of the instruction B, the address calculation of the instruction B can be started earlier than when the output from the primary execution unit is used for the calculation. In this manner, an undesirable delay of the address calculation of the instruction B due to the address conflict can be minimized. Thus, the secondary execution unit functions to obviate the address conflict situation as early as possible so as to ensure data processing at a high speed.

The same problem occurs also when a branch-on-condition instruction is to be executed. In the execution cycle of the branch-on-condition instruction (which will be abbreviated hereinafter as a BC instruction), a condition code determined before the execution cycle is used to judge whether or not the branch is sucessful. Therefore, when an instruction D preceding this BC instruction instructs an operation which changes the condition code, the branch judgment cannot be made until the operation according to the preceding instruction D is completed. In such a situation, the branch judgment for the BC instruction must be made after the end of operation according to the preceding instruction D. Occurrence of such a situation is called hereinafter the presence of a condition code conflict. According to the prior art, the condition code determined by the secondary execution unit is used to judge whether or not the branch is successful so as to expedite the branch judgment.

However, data processing at higher speeds is now increasingly demanded.

SUMMARY OF THE INVENTION

It is a primary object of the present invention to provide a data processing apparatus of pipeline control mode which can achieve data processing at a speed higher than hitherto available.

According to the prior art, an operation according to the instruction A is not started before the primary execution unit completes the operation according to an instruction C preceding the instruction A. Therefore, the beginning of the operation according to the instruction B is also delayed. By causing the operation according to the instruction A to be executed in the secondary execution unit while the primary execution unit is executing the operation according to the instruction C, it is apparent that the address calculation of the instruction B utilizing the operation result from the secondary execution unit can be expedited.

Similarly, when the primary execution unit is executing the operation according to an instruction E preceding the instruction D preceding the BC instruction, the beginning of the operation according to the BC instruction will also be delayed unless the operation according to the instruction D is executed after execution of the instruction E. However, by causing the secondary execution unit to execute the operation according to the instruction D while the primary execution unit is executing the operation according to the instruction E, the BC instruction can also be executed by the secondary execution unit after this unit completes the operation according to the instruction D.

The present invention is based on the idea above described. According to the present invention, the circuit for selectively supplying to the two execution units data obtained by decoding the instructions and required for the execution of the operation stages of the decoded instructions includes a circuit supplying the data to the primary execution unit in synchronism with the end of operation in the primary execution unit and a circuit supplying the data to the secondary execution unit in synchronism with the end of operation in the secondary execution unit, whereby the secondary execution unit can execute the next operation without waiting for the end of operation being executed in the primary execution unit.

BRIEF DESCRIPTION OF THE DRAWINGS

FIGS. 1A and 1B are block circuit diagrams of different parts of an embodiment of a data processing apparatus according to the present invention.

FIG. 2 shows the arrangement of FIGs. 1A and 1B for constituting the data processing apparatus.

FIGS. 9A to 9C are timing charts illustrating the operation of the various parts of the embodiment in the presence of an address conflict.

DESCRIPTION OF THE PREFERRED EMBODIMENT

Outline of Apparatus

Figure 1A:
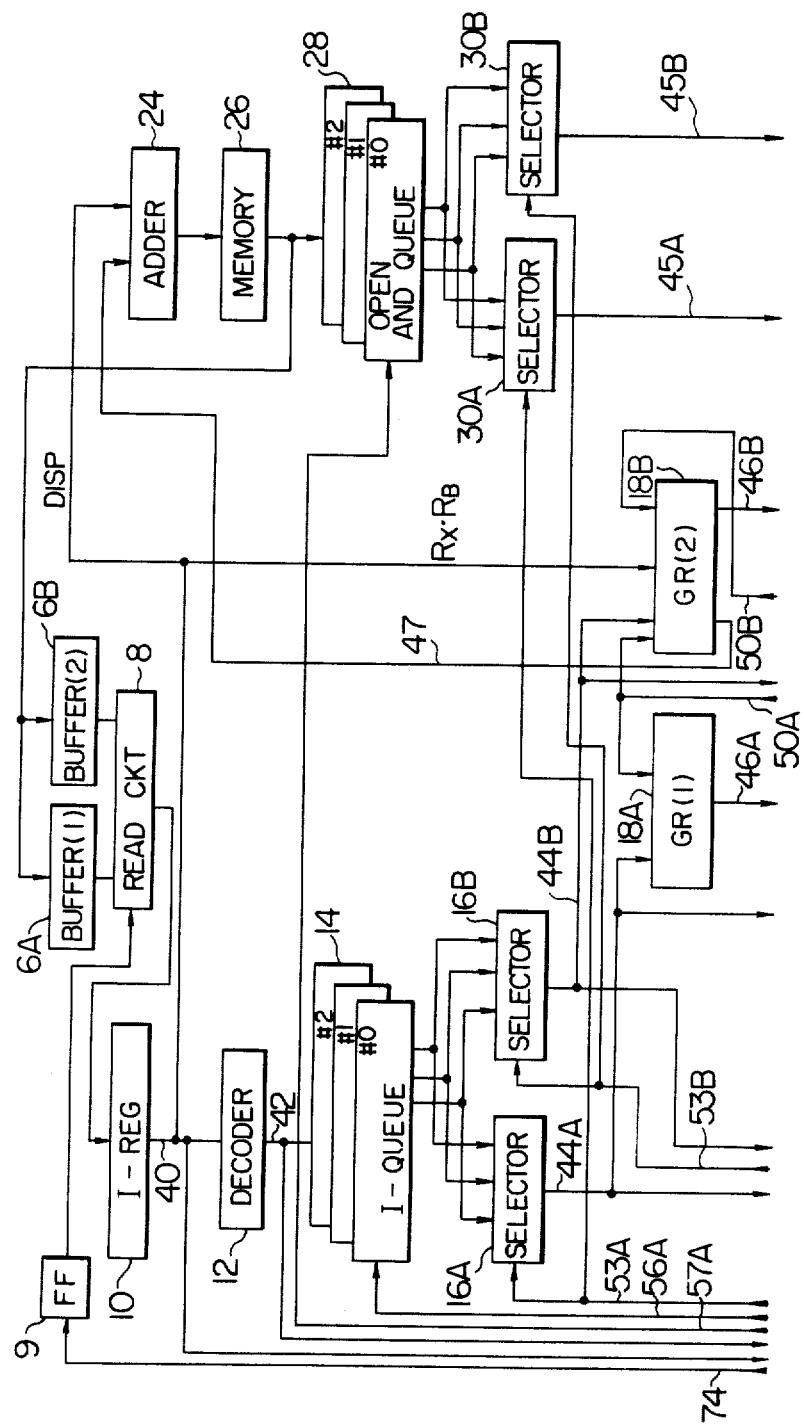

Referring to FIGS. 1A and 1B, an embodiment of the data processing apparatus according to the present invention includes instruction buffers 6A and 6B, a read circuit 8 for selectively reading out instructions from these instruction buffers 6A and 6B, a flip-flop 9, an instruction register 10, an instruction decoder 12, and an instruction queue register 14 for registering decoded information applied from the decoder 12. The instruction queue register 14 shown in FIG. 1A is composed of three registers for registering decoded information of three instructions, respectively. The apparatus further includes a selector 16A for selecting the information registered in the instruction queue register 14, and a first execution unit 20A (which will be abbreviated hereinafter as a 1st E unit) which executes the instruction selected by the selector 16A. This 1st E unit 20A is constructed so that operations specified by all of the instructions to be executed by the apparatus can be executed. The apparatus further includes a first general register 18A for registering the operands to be supplied to the 1st E unit 20A or registering the results of operation supplied from the 1st E unit 20A, and a first instruction unit 22A (which will be abbreviated hereinafter as a 1st I unit) which controls the instruction execution within the 1st E unit 20A.

The apparatus further includes an address adder 24 for calculating the address of the memory operand required for the operation by the 1st E unit 20A, a main memory 26, and an operand queue buffer 28 for storing the memory operands read out from the main memory 26. This operand queue buffer 28 is composed of three buffers for storing the three operands corresponding to the three instructions registered in the instruction queue register 14, respectively. The apparatus further a selector 30A which selects the operands includes a selector 30A which selects the operands stored in the buffer 28 and supplies the same to the 1st E unit 20A. The circuits above described are those fundamentally required for the execution of instructions by the 1st E unit 20A according to the pipeline control mode.

Besides the circuits above described, the apparatus embodying the present invention includes a second execution unit 20B (which will be abbreviated hereinafter as a 2nd E unit), a selector 16B for selecting from the instruction queue register 14 the decoded information of the instructions to be executed by the 2nd unit 20B, a second general register 18B for registering the operands to be supplied to the 2nd E unit 20B or registering the results of operation supplied from the 2nd E unit 20B, a selector 30B for selecting from the operand queue buffer 28 the memory operands required by the 2nd E unit 20B, a second instruction unit 22B (which will be abbreviated hereinafter as a 2nd I unit) which controls the execution of the instructions by the 2nd E unit 20B, condition code registers 34A and 34B for registering the condition codes supplied from the 1st and 2nd E units 20A and 20B, respectively, and an address conflict detection circuit 32 and a condition-code conflict detection circuit 36 for detecting respectively the presence of an address conflict and the presence of a condition code conflict between the plural instructions which are executed in a pipeline mode.

The 2nd E unit 20B executes relatively simple operations, for example, addition, subtraction, etc. For simplicity, it is assumed herein that the 2nd E unit 20B employed in the embodiment of the present invention is to execute only an operation which can be completed in one machine cycle. However, as will become apparent a from the later description, the 2nd E unit 20B employed in the present invention is in no way limited to such a simple unit. Since the 2nd E unit 20B is provided for executing such a relatively simple operation at a high speed, this unit 20B is desirably disposed nearer to the 2nd general register 18B and operand queue buffer 28 than the 1st E unit 20A. The 1st and 2nd general registers 18A and 18B are composed of the same number of registers.

In the apparatus, the 1st E unit 20A can execute all of the instructions. Among these instructions, some instructions require updating or renewing of the contents of the 1st general register 18A and are also executed by the 2nd E unit 20B. Therefore, such instructions are executed by both of the 1st and 2nd E units 20A and 20B. However, when the 1st and 2nd E units 20A and 20B are to execute the same operation in response to the same instruction, the operation starting timing of the former differs from that of the latter. Thus, the two selectors 16A and 16B are provided for independently supplying decoded information required by the 1st and 2nd E units 20A and 20B, respectively, and the two selectors 30A and 30B are provided for independently supplying memory operands required by the 1st and 2nd E units 20A and 20B, respectively. The 1st E unit 20A and the associated selectors 16A and 30A are controlled by the 1st I unit 22A, while the 2nd E unit 20B and the associated selectors 16B and 30B are controlled by the 2nd I unit 22B. Thus, even when the 1st E unit 20A is unable to execute an instruction, the 2nd E unit 20B can execute that instruction, so that elimination of an address conflict or a condition code conflict can be expedited.

Instruction Format

Figure 3A:
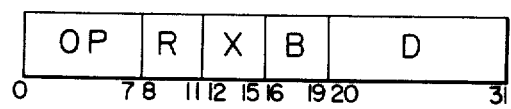
FIGS. 3A and 3B show, by way of example, two instruction formats employed in the embodiment of the present invention respectively.

Instructions employed in the data processing apparatus of the present invention are the same as those employed in the M-series computers made by Hitachi, Ltd. in Japan or those employed in the 370-series computers made by IBM Corporation in the U.S.A. These instructions are classified into a plurality of formats. FIG. 3A shows an instruction format necessary for the understanding of the present invention. This instruction format includes a multiply instruction, an add instruction and a load instruction which will be abbreviated hereinafter as an M instruction, an A instruction, and an L instruction respectively, for simplicity of description. Bits Nos. 0 to 7 of these instructions represent the operation code (OP CODE), and bits Nos. 8 to 11 represent the register part (R). In the case of the M and A instructions, this register part indicates the general register number registering the operand to be read out for the operation and indicates also the register number in which the result of the operation is to be registered. In the case of the L instruction, this register part (R) indicates the register number in which the result of the operation is to be registered. Bits Nos. 12 to 15 and bits Nos. 16 to 19 represent the index part (X) and base part (B), respectively, and indicate the general register numbers both used for the calculation of the addresses of the memory operands to be read out from the main memory 26. The general register numbers indicated by the register part (R), index part (X) and base part (B) will be referred to hereinafter as the operand register number $R_{OP}$, index register number $R_X$ and base register number $R_B$, respectively. Bits Nos. 20 to 31 represent the displacement part (D) indicating the displacement value DISP used for the address calculation above described.

Figure 3B:
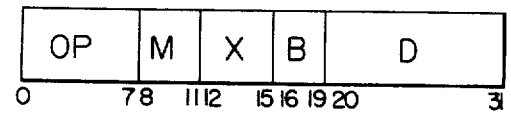

FIG. 3B shows an instruction format of a BC instruction. Bits Nos. 8 to 11 in this instruction format represent the mask part (M) and specifies the value of the condition code with which the branch is successfully done. The index part (X), base part (B) and displacement value DISP of the BC instruction are used for calculating the address of the target instruction to be read out from the main memory 26.

In the following description of the embodiment of the present invention, only the M, A, L and BC instructions will be referred to. Among these instructions, those which can be executed by the 2nd E unit 20B are the A and L instructions, and that which changes the condition code is the A instruction.

Instruction Reading

One of the instruction buffers 6A and 6B is used for storing a stream of instructions (which will be referred to hereinafter as a main stream) stored in the main memory 26 and including an instruction to be processed now, while the other is used for storing another stream of instructions (which will be referred to hereinafter as a target stream) stored in the main memory 26 and beginning from a target instruction to be executed after the processing of a BC instruction on the main stream is started. When the branch is proven to be successful as a result of the processing of the BC instruction, and the processing of the target instruction is started, the instruction stream which has been the target stream up to that time is now regarded to be the main stream. In this manner, the instruction buffer storing the main stream is switched over to the other each time the branch is proven to be successful as a result of processing of the BC instruction. An instruction fetch circuit (not shown) controls fetching of the instruction streams from the main memory 26 and storing of the instruction streams in the instruction buffers A and 6B. The read circuit 8 selects sequentially the instructions from the instruction buffer 6A or 6B storing the main stream now and applies them sequentially to the instruction register 10. This read circuit 8 selects the instruction buffer 6A or 6B depending on whether the flip-flop 9 stores "1" or "0". As described later, the value stored in this flip flop 9 changes each time a branch success signal BCTKN turns into "1" level. As also described later, the instruction output from the read circuit 8 is set in the instruction register 10 under control of a control circuit (not shown) each time the decode stage of the instruction already registered in the instruction register 10 has been executed.

Outline of Execution of Instructions

The instruction set in the instruction register 10 is executed through the following plural stages.

[D stage]

In this D stage, the instruction is decoded, and the address is calculated. More concretely, the instruction set in the instruction register 10 is decoded by the instruction decoder 12 to produce decoded information which is set in one of the registers of the instruction queue register 14. Further, the base register number $R_B$ and index register number $R_X$ of the instruction set in the instruction register 10 are applied by way of a line 40 to the 2nd general register 18B. Two data read out from the 2nd general register 18b on the basis of these register numbers $R_B$ and $R_X$ are applied by way of a line 47 to the adder 24 to be added to the displacement value DISP applied by way of the line 40 from the instruction register 10, thereby calculating the address.

In the embodiment of the present invention, the instruction decoder 12 produces the following decoded information on the basis of the OP CODE and operand register number $R_{OP}$ of the instruction, and such information appear on a line 42:

(1) OP CODE (2) $R_R$: This is represents the register number from which the operand is read out, and is equal to the operand register number $R_{OP}$ in the case of the M and A instructions.

(3) $R_W$: This represents the register number in which the result of operation is written, and is equal to the operand register number in the case of the M, A and L instructions.

(4) SUBGR: This is a 2nd -E-unit operation indication signal indicative of whether or not the instruction alters the general register as a result of its operation and can be executed by the 2nd E unit 20B. For example, this signal turns into its "1" level in the case of the A and L instructions.

(5) CHGGR: This is a register change indication signal indicative of the fact that the instruction alters the general register as a result of operation. For example, this signal turns into its "1" level in the case of the M, A and L instructions.

(6) SUBCC: This is a 2nd -E-unit operation indication signal indicative of the fact that the instruction changes the condition code and can be executed by the 2nd E unit 20B. For example, this signal turns into its "1" level in the case of the A instruction.

(7) CHGCC: This is a condition-code change indication signal indicative of the fact that the instruction changes the condition code. For example, this signal turns into its "1" level in the case of the A instruction.

(8) BC: This is a BC instruction indication signal indicative of the fact that the instruction is the BC instruction.

(9) MASK: This signal represents the mask part itself of the BC instruction.

Although the decoder 12 produces decoded information, other than those described above, required for the control of instruction execution, they are the same as those of the prior art, and any description of such other information is unnecessary herein since they have not any direct concern with the present invention.

The D stage is completed in one machine cycle.

[A stage]

On the basis of the memory address calculated in the D stage, the corresponding memory operand is read out from the main memory 26 to be stored in one of the buffers of the operand queue buffer 28. This A stage is also completed in one machine cycle.

[L1 stage]

The decoded information of the instruction, the register operand and the memory operand required for operation are set in the 1st E unit 20A. More concretely, the selector 16A selects the decoded information of the instruction to be executed, and the selected decoded information appears on a line 44A. Among the selected decoded information, the read register number $R_R$ is applied to the 1st general register 18A, and, on the basis of this input, the required operand RDATA1 is read out to be applied to the 1st E unit 20A by way of a line 46A.

On the other hand, the OP CODE, write register number $R_W$, 2nd -E-unit operation indication signal SUBGR, register change indication signal CHGGR and condition-code change indication signal CHGCC in the decoded information are directly applied to the 1st E unit 20A.

The selector 30A selects the required memory operand MDATA1 from the operand queue buffer 28 and applies it to the 1st E unit 20A by way of a line 45A. The various data thus applied are registered in the internal registers of the 1st E unit 20A. This L1 stage is also completed in one machine cycle.

[E1 stage]

On the basis of the data applied to the 1st E unit 20A in the L1 stage, the 1st E unit 20A executes the necessary operation, and the result of the operation WDATA1 appears on a line 50A. At the same time, the write register number $R_W$ applied already and a 1st-general-register write signal WC1 appear from the 1st E unit 20A. When the operation is such that the condition code is to be changed, the 1st E unit 20A calculates a condition code CC1 depending on the result of operation, and this condition code CC1 appears together with a set command signal SET1 on a line 70A.

The number of machine cycles required in this E1 stage differs depending on the kind of operation executed according to the instruction. The shortest operation is completed in one machine cycle. At the end of the final one of the machine cycles belonging to this E1 stage, an operation end signal EOP1 appears on a line 48A. Therefore, in the case of an operation completed in one machine cycle, the signal EOP1 appears at the operation beginning cycle.

[P1 stage]

The result of operation WDATA1 obtained in the E1 stage is written in the register indicated by the write register number $R_W$ among those of the 1st general register 18A. When the operation is such that it cannot be executed by the 2nd E unit 20B, the result of operation WDATA1 and write register number $R_W$ are applied also to the 2nd general register 18B to be similarly written therein. As described already, the 2nd E unit 20B can only execute limited operations, and its result of operation WDATA2 is written in the 2nd general register 18B. Consequently, non-coincidence occurs between the contents of the 1st and 2nd general registers 18A and 18B. However, this non-coincidence can be avoided by writing the result of operation WDATA1 provided by the 1st E unit 20a into the 2nd general register 18B too. Therefore, the 2nd general register 18B can participate in the address calculation without any trouble. When the operation is such that the condition code is to be changed, the calculated condition code CC1 is set in the condition code register 34A in response to the set command signal SET1. This P1 stage is completed in one machine cycle contiguous to the E1 stage.

In the manner described above, execution of one instruction is completed. However, because of the fact that the 2nd E unit 20B executes also some instructions which instructs renewal of the contents of the general register or change of the condition code, the following stages are also executed besides those described above.

[L2 stage]

In this L2 stage, the decoded information, register operand and memory operand requird for the operation are set in the 2nd E unit 20B. More concretely, the selector 16B selects the decoded information of the instruction to be executed, and the selected information appears on a line 44B. Among the decoded information selected by the selector 16B, the read registe number $R_R$ is applied to the 2nd general register 18B, and, on the basis of this read register number $R_R$, the required register operand RDATA2 is read out to be supplied to the 2nd E unit 20B by way of a line 46B.

On the other hand, the OP CODE, write register number $R_W$, 2nd-E-unit operation indication signals SUBGR, SUBCC and condition-code change indication signal CHGCC in the decoded information are applied directly to the 2nd E unit 20B. Further, the selector 30B selects the required memory operand MDATA2 from the operand queue buffer 28 to supply the selected memory operand DMATA2 to the 2nd E unit 20B by way of a line 45B. The various data thus applied are registered in the internal registers of the 2nd E unit 20B. This L2 stage is also completed in one machine cycle.

[E2 stage]

On the basis of the data supplied to the 2nd E unit 20B in the L2 state, the 2nd E unit 20B executes the necessary operation, and the result of operation WDATA2 appears on a line 50B. At the same time, the write register number $R_W$ applied already appears also from the 2nd E unit 20B. When the operation is such that the condition code is to be changed, the 2nd E unit 20B calculates a condition code CC2 depending on the result of the operation. It is assumed herein that the 2nd E unit 20B executes relatively simple operations, for example, addition, subtraction, loading, etc. in one machine cycle and is not capable of executing a relatively complex operation such as multiplication. Therefore, this E2 stage is completed in one machine cycle. Generally, the 2nd E unit 20B is not limited to such a simple one, and the E2 stage may be completed in a number of different machine cycles depending on the operation to be executed by the 2nd E unit 20B. In such a case, an operation end signal EOP2 appears on a line 48B at the final cycle of the E2 stage, and this final cycle can be called an EOP2 cycle. Therefore, this E2 stage includes the EOP2 cycle only when, as presently assumed, the 2nd E unit 20B executes necessarily the operation which is completed in one machine cycle.

[P2 stage]

In this P2 stage, the result of the operation WDATA2 obtained in the E2 stage is written in the register indicated by the write register number $R_W$ among those registers of the 2nd general register 18B. Also, the calculated condition code CC2 is set in the condition code register 34B by way of a line 70B.

Apparatus Operation Details - I

The operation of the apparatus in the case of the presence of an address conflict will now be described in detail. Among the various parts of the apparatus, those having concern with the condition code and the operation of such parts will be collectively described later.

It is assumed herein that the M, A and L instructions are executed in the above order. It is further assumed that the operand register number $R_{OP}$ of the A instruction is equal to the index register number $R_X$ or base register number $R_B$ of the L instruction, and, consequently, there occurs an address conflict between these two instructions A and L. However, it is assumed that there is no address conflict between the M and A instructions, between the M and L instructions or between the M, A, L instructions and their preceding instructions. It is also assumed that a condition code conflict is present between none of these instructions.

Figure 9C:
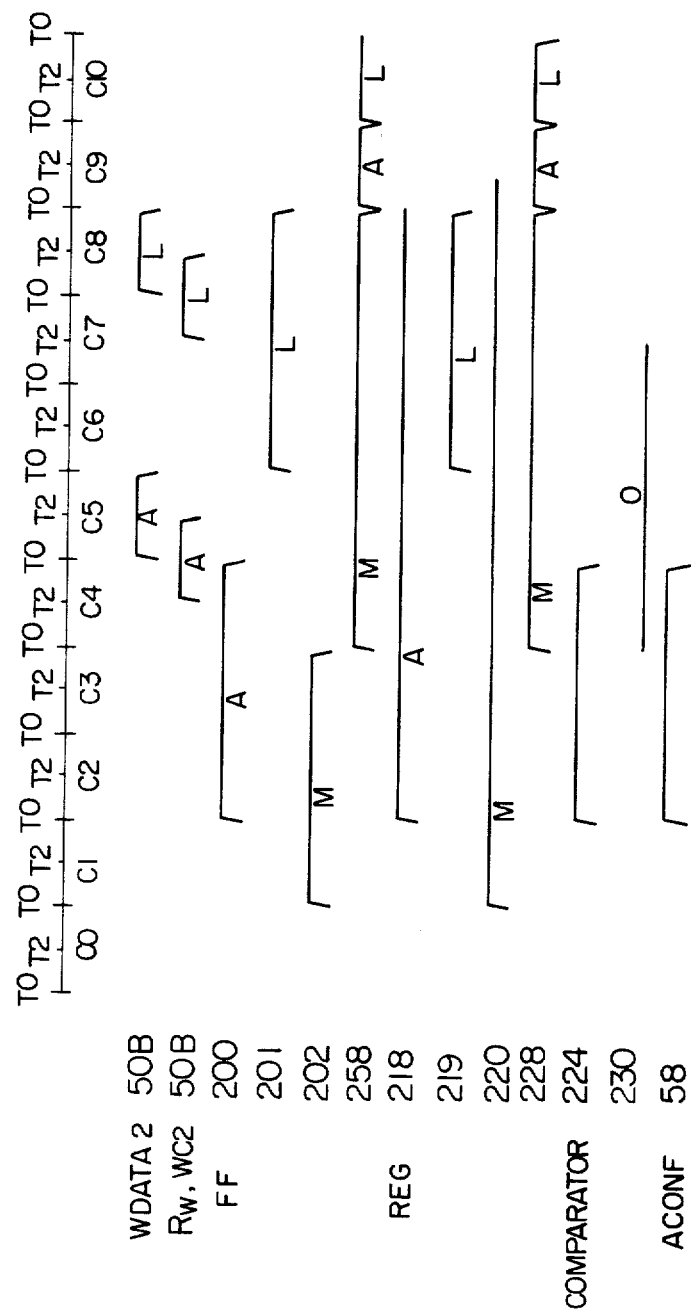

The operation of the apparatus in the presence of an address conflict will be described with reference to the timing charts of FIGS. 9A to 9C.

[Details of the D stage]

For the execution of the D stage, decoded information of an instruction must be set in the instruction queue register 14. The 1st I unit 22A controls the setting of the decoded information in the instruction queue register 14. The manner of this control is not fundamentally different from the prior art manner of control. More concretely, such decoded information can be newly set in the instruction queue register 14 only when an instruction is set in the instruction register 10, one of the registers of the instruction queue register 14 is idle, and there is neither an address conflict nor a condition code conflict between the instruction set in the instruction register 10 and an instruction already set in the instruction queue register 14 or an instruction being executed at that time.

Figure 4:
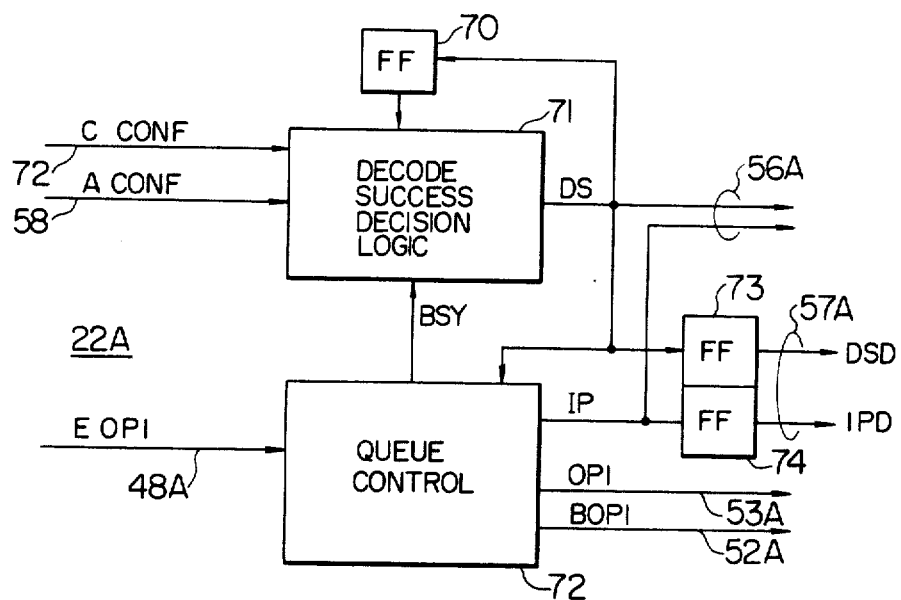
FIG. 4 shows schematically the structure of the first instruction unit employed in the embodiment of the present invention.

For the purpose of detection of an address conflict, the base and index register numbers $R_B$ and $R_X$ of the instruction set in the instruction register 10 are applied to the address conflict detection circuit 32 by way of the line 40. The address conflict detection circuit 32 detects the presence or absence of an address conflict in a manner as described later, and a signal indicative of the result of detection ACONF is applied to the 1st I unit 22A by way of a line 58. Similarly, as described later, the condition-code conflict detection circuit 36 detects the presence or absence of a condition code conflict, and a signal indicative of the result of detection CCONF is applied to the 1st I unit 22A by way of a line 74. As shown in FIG. 4, the 1st I unit 22A includes a flip-flop 70 which is set under control of a control circuit (not shown) each time a new instruction is set in the instruction register 10 under control of the control circuit. Referring to FIG. 4, a queue control circuit 72 includes three flip-flops (not shown) for indicating whether the individual registers of the instruction queue register 14 are idle or not, respectively, and a queue busy signal BSY appears from the queue control circuit 72 when none of the registers of the instruction queue register 14 are found to be idle because all of these three flip-flops are in their set state. when the output signal from the flip-flop 70 is in its "1" level, and all of the conflict detection signals ACONF, CCONF and the queue busy signal BSY are in their "0" level, a decode success decision logic circuit 71 applies a decode success signal DS to the instruction queue register 14 by way of a line 56A to instruct storing of decoded information from the decoder 12. The queue control circuit 72 applies an input pointer IP to the instruction queue register 14 by way of the line 56A. This input pointer IP instructs the register number of one of the registers of the instruction queue register 14 in which the decoded information is to be registered. For generating this input pointer IP, the queue control circuit 72 includes therein a counter (not shown) which counts 0, 1 and 2 sequentially, and the count output from this counter provides the input pointer IP. This counter counts in a relation delayed by one cycle from the rising edge of the decode success signal DS. The flip-flop 70 is reset by the decode success signal DS, and a new instruction is set in the instruction register 10 under control of the control circuit (not shown).

Suppose now that the M, A and L instructions are set in the above order in the No. 2, No. 0 and No. 1 registers respectively of the instruction queue register 14. Hereinafter, the first timing and middle timing of each cycle are designated by $T_o$ and $T_2$ respectively. The symbols $(T_o)$ and $(T_2)$ attached to the registers and flip-flops shown in the accompanying drawings indicate that the contents of these registers and flip-flops are changed at the timings $T_o$, $T_2$, respectively. The M instruction is set in the instruction register 10 at timing $C_o$, $T_o$. This symbol $C_o$, $T_o$ means that the instruction is set at timing $T_o$ in a cycle $C_o$, and similar symbols have similar meanings hereinafter. It is assumed herein that there is neither an address conflict nor a condition code conflict between the M instruction so set and another preceding instruction. Then, the decode success signal DS is generated at timing $C_o$, $T_2$. Since it is assumed that the value of the input pointer IP at that time is 2, the decoded information of the M instruction is set in the No. 2 register of the instruction queue register 14 at timing $C_1$, $T_o$ in response to those signals. Subsequently, the value of the input pointer IP is changed to 0 at timing $C_1$, $T_2$. At timing $C_1$, $T_o$, the A instruction is set in the instruction register 10, and the D stage of the A instruction is executed in exactly the same manner as the execution of the D stage of the M instruction, except that the former is executed in a relation delayed by one cycle from the latter. Consequently, the decoded information of the A instruction is set in the No. 0 register of the instruction queue register 14, and the value of the input pointer IP is now changed to 1.

The L instruction is to be then set in the instruction register 10 at timing $C_2$, $T_o$. It is assumed, however, that there is an address conflict between this L instruction and the A instruction having already set in the instruction queue register 14. Therefore, the output signal ACONF of "1" level appears, as described later, from the address conflict detection circuit 32, and the decode success signal DS does not appear from the decode success decision circuit 71 until the absence or removal of this address conflict is detected. Therefore, the L instruction is not set in the instruction queue register 14 at timing $C_2$, $T_o$, and execution of the D stage of the L instruction is deferred. In the embodiment of the present invention, the D stage of the L instruction is executed in a cycle $C_5$ as described later. Therefore, the value of the input pointer IP continues to be maintained at 1.

The address calculation in the D stage proceeds with timing as described below.

After the M instruction is set in the instruction register 10 at timing $C_o$, $T_o$, the address information specified by this M instruction is immediately read out from the 2nd general register 18B, and the memory address generated from the adder 24 is established at timing $C_o$, $T_2$.

The address calculation for the A instruction is done in entirely the same manner as the address calculation for the M instruction but in a relation delayed by one cycle from the latter, and the memory address for the A instruction is established at timing $C_1$, $T_2$.

Each of the flip-flops (not shown), which are included in the queue control circuit 72 in the 1st I unit 22A to indicate whether or not the individual registers of the instruction queue register 14 are idle, is set each time new decoded information is set in the associated register of the instruction queue register 14.

[Details of A stage]

In this A stage, the memory operands are read out from the main memory 26 on the basis of the memory addresses obtained in the D stage and are set in the operand queue buffer 28. As described already, the decoded information of the M instruction is set in the No. 2 register of the instruction queue register 14. Therefore, the memory operand corresponding to the M instruction is also set in the No. 2 buffer of the operand queue buffer 28. For this purpose, the 1st I unit 22A is so arranged that signals IPD and DSD provided by delaying the input pointer IP and decode success signal DS by one cycle by flip-flops 73 and 74, respectively, can be applied to the operand queue buffer 28 by way of a line 57A. Thus, the memory operand corresponding to the M instruction is set in the No. 2 buffer of the operand queue buffer 28 at timing $C_2$, $T_o$ in response to the signals DSD and IPD. Similarly, the memory operand corresponding to the A instruction is set in the No. 0 buffer of the operand queue buffer 28 at timing $C_3$, $T_o$.

[Details of L1 stage]

The L1 stage of each instruction is started after the E1 stage of the preceding instruction has been completed, that is, as soon as the 1st-E-unit operation end signal EOP1 is generated from the 1st E unit 20A. In this L1 stage, one decoded information and one memory operand are selected from the instruction queue register 14 and operand queue buffer 28 by the selectors 16A and 30A, respectively, to be set in the 1st E unit 20A.

The 1st I unit 22A controls the above operation. More concretely, the queue control circuit 72 in the 1st I unit 22A includes a counter (not shown) which applies an output pointer OP1 indicative of the register number and buffer number to be selected, to the selectors 16A and 30A by way of a line 53A. This counter repeatedly counts 0, 1 and 2 sequentially. After the 1st-E-unit operation end signal EOP1 appears from the 1st E unit 20A, a 1st-E-unit operation beginning signal BOP1 appears on a line 52A during one cycle from the queue control circuit 72, and the output pointer OP1 is changed at timing $T_o$ of the cycle succeeding the cycle in which the signal BOP1 is generated. As described later, the operation end signal EOP1 continues to appear from the 1st E unit 20A until the operation beginning signal BOP1 is applied after the timing $T_o$ of the final cycle of the E1 stage of the preceding instruction. Suppose that the E1 stage of an instruction preceding the M instruction (which will be referred to as an instruction X) is completed in the cycle $C_2$. Then, the operation end signal EOP1 continues to be generated during one cycle starting from timing $C_2$, $T_o$. As assumed already, the value of the output pointer OP1 generated from the queue control circuit 72 is 2 for selecting the M instruction, and the 1st-E-unit operation beginning signal BOP1 continues to be generated during one cycle starting from timing $C_2$, $T_o$. The value of the output pointer OP1 is changed to 0 at timing $C_3$, $T_o$.

In the manner described above, the selectors 16A and 30A select the decoded information of the M instruction and the memory operand corresponding to the M instruction, respectively, on the basis of the value, 2, of the output pointer OP1 generated in the cycle $C_2$. The 1st E unit 20A receives this selected information in response to the 1st-E-unit operation beginning signal BOP1 generated in the cycle $C_2$. The read register number $R_R$ in the decoded information selected by the selector 16A is applied to the 1st general register 18A, and the register operand RDATA1 read out from the 1st general register 18A on the basis of the input $R_R$ is applied to the 1st E unit 20A by way of the line 46A. Thus, the 1st E unit 20A receives also this operand RDATA1.

Figure 5:
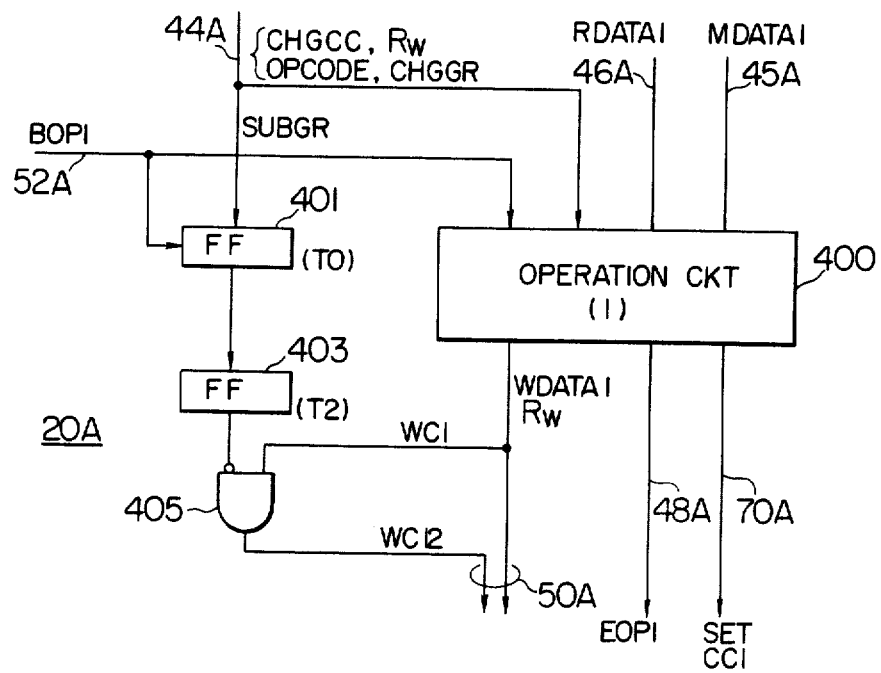
FIG. 5 shows schematically the structure of the first execution unit employed in the embodiment of the present invention.

As shown in FIG. 5, the 1st E unit 20A includes a 1st operation circuit 400, flip-flops 401, 403 and an AND gate 405. The OP CODE, write register number $R_W$, register change indication signal CHGGR and condition-code change indication signal CHGCC applied from the selector 16A by way of the line 44A, the register operand RDATA1 applied from the 1st general register 18A by way of the line 46A, and the memory operand MDATA1 applied from the selector 30A by way of the line 45A, are set in internal registers (not shown) of the 1st operation circuit 400 in response to the operation beginning signal BOP1 applied from the 1st I unit 22A by way of the line 52A. On the other hand, the 2nd -E-unit operation indication signal SUBGR applied from the selector 16A by way of the line 44A is set in the flip-flop 401 in response to the signal BOP1. In this manner, the 1st E unit 20A receives the necessary input data.

In the example under consideration, the data related to the M instruction is applied to the 1st E unit 20A at timing $C_2$, $T_o$, and the L1 stage of the M instruction is completed in one cycle. However, the L1 stage of the A instruction succeeding the M instruction is not executed before the timing (a cycle $C_7$ herein) at which the operation end signal EOP1 corresponding to the M instruction is generated.

[Details of E1 stage]

The 1st operation circuit 400 executes the operation specified by the OP CODE applied thereto. For example, the 1st operation circuit 400 executes multiplication of the register operand RDATA1 and memory operand MDATA1 for the M instruction, and the result of operation WDATA1 appears on the line 50A. Also, this circuit 400 continues to generate the operation end signal EOP1 until the operation beginning signal BOP1 is applied after the timing $T_o$ of the final cycle of its operation. The write register number $R_W$ in the decoded information input is held in this circuit 400 until the resultant data WDATA1 is calculated, and the write register number $R_W$ appears then on the line 50A together with the resultant data WDATA1.

When the condition-code change indication signal CHGCC of "1" level is applied, the circuit 400 calculates the condition code CC1 depending on the OP CODE and resultant data WDATA1, and this signal CC1 appears on the line 70A in the final cycle together with the set command signal SET1. The set command signal SET1 remains in its "0" level when the input signal CHGCC is in its "0" level. Further, when the register change indication signal CHGGR of "1" level is applied, a write signal WC1 appears on the line 50A from the circuit 400 in synchronism with the appearance of the resultant data WDATA1. This circuit 400 is, for example, a microinstruction-controlled circuit.

On the other hand, the 2nd -E-unit operation indication signal SUBGR set in the flip-flop 401 at timing $T_o$ is transferred to the flip-flop 403 at timing $T_2$ of the same cycle. An inverted signal of the signal SUBGR in the flip-flop 403 is applied to the AND gate 405 together with the write signal WC1 applied by way of the line 50A. Therefore, the output signal WC12 from this AND gate 405 is in its "1" level only when the operation executed in the 1st operation circuit 400 cannot be executed by the 2nd E unit 20B and is used for changing the contents of the 1st general register 18A. This output signal WC12 is used for writing the result of operation WDATA1 in the 2nd general register 18B.

It is assumed that the M instruction under consideration requires five machine cycles for operation. Therefore, the resultant data WDATA1 and operation end signal EOP1 appear from the circuit 400 in cycles $C_8$ and $C_7$ respectively. Further, it is also assumed that this M instruction cannot be executed by the 2nd E unit 20B. Therefore, the output signal WC12 from the circuit 400 is in its "1" level.

When the operation end signal EOP1 is generated in the cycle $C_7$, the operation beginning signal BOP1 for the A instruction succeeding the M instruction is generated from the 1st I unit 22A, so that execution of the L1 stage of the A instruction is now possible. Since the E1 stage of the A instruction requires only one cycle, it is completed in the cycle $C_8$ only.

[Details of P1 stage]

The resultant data WDATA1 appearing on the line 50A from the 1st E unit 20A is written at timing $T_2$ in the registers indicated by the write register number $R_W$ among those of the 1st and 2nd general registers 18A and 18B depending on the write signals WC1 and WC12 appearing on the line 50A. Further, the calculated condition code CC1 is written in the condition code register 34A in response to the set command signal SET1. Therefore, the condition code calculated according to the latest executed instruction among those requiring changing of the condition code is now set in the condition code register 34A. Thus, the P1 stages of the M and A instructions are executed in the cycles $C_8$ and $C_9$ respectively. Since, in this case, the 2nd E unit 20B can also execute the A instruction (SUBGR="1"), the write signal WC12 is in its "0" level, and the resultant data WDATA1 for the A instruction is not written in the 2nd general register 18B. Also, since the M instruction does not instruct changing of the condition code, there occurs no change in the contents of the condition code register 34A during the P1 stage of the M instruction. The condition code CC1 calculated by the execution of the A instruction is set in the condition code register 34A in the cycle $C_9$.

In the manner described above, the D to P1 stages of the M and A instructions are executed. However, it is assumed herein that there is an address conflict between the A instruction and the L instruction succeeding the A instruction. Therefore, the D stage of the L instruction is not executed until this address conflict is removed. According to the prior art, this address conflict is removed at the end of the E1 stage of the A instruction, that is, at the end of the cycle $C_8$, and, therefore, the D stage of the L instruction is started from the cycle $C_9$.

In contrast, according to the embodiment of the present invention, the 2nd E unit 20B is actuated prior to the end of the E1 stage of the A instruction in order to expedite the starting of the D stage of the L instruction. This feature will now be described in further detail.

[Details of L2 stage]

Figure 6:
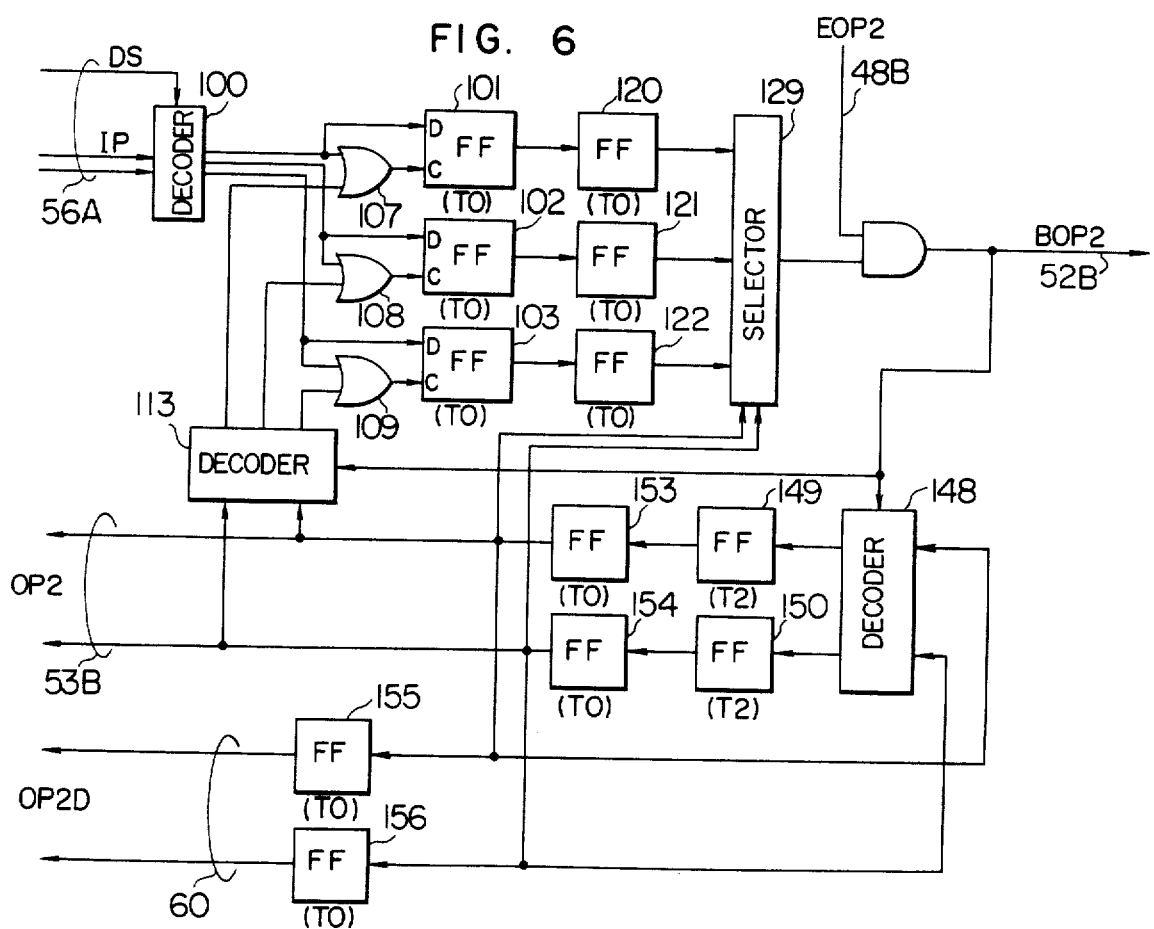
FIG. 6 shows schematically the structure of the second instruction unit employed in the embodiment of the present invention.

In this L2 stage, necessary data is set in the 2nd E unit 20B. This L2 stage is controlled by the 2nd I unit 22B. As shown in FIG. 6, this 2nd I unit 22B includes three flip-flops 101, 102 and 103 corresponding to the No. 0, No. 1 and No. 2 registers, respectively, of the instruction queue register 14. These flip-flops 101 to 103 indicate whether or not decoded information is set in the corresponding registers of the instruction queue register 14. Referring to FIG. 6, a decoder 100 is actuated by the decode success signal DS and generates an output signal of "1" level in response to the input pointer IP applied thereto, so that such a signal can be applied to one of the flip-flops 101 to 103 corresponding to the register number indicated by the input pointer IP. This signal is thus applied to the data input terminal of one of the flip-flops 101 to 103 corresponding to the input pointer IP and also applied through corresponding one of OR gates 107 to 109 to the clock input terminal of the corresponding flip-flop 101, 102 or 103. Thus, one of the flip-flops 101 to 103 corresponding to the value indicated by the input pointer IP is set. It is supposed herein that these flip flops 101 to 103 receive the input data at the timing $T_o$ only. Flip-flops 120, 121 and 122 are provided to delay the outputs from the associated flip-flops 101 to 103 by one cycle respectively, and the outputs from these flip-flops 120 to 122 change also at the timing $T_o$ only.

Flip flops 149, 150, 153, 154 and a decoder 148 constitute a counter which counts 0, 1 and 2 sequentially, and the outputs from the flip-flops 153 and 154 provide an output pointer OP2 which is used to select information of an instruction to be executed by the 2nd E unit 20B. More concretely, this output pointer OP2 is applied to the selectors 16B and 30B by way of a line 53B, so that the decoded information of the instruction to be executed and the memory operand MDATA2 respectively selected by the selectors 16B and 30B appear on the lines 44B and 45B, respectively. However, this information can be set in the 2nd E unit 20B when this 2nd E unit 20B has completed the operation of a preceding instruction and the information of the instruction whose L2 stage is to be executed next has already been set in the instruction queue register 14 and operand queue buffer 28. As described later, the outputs from the selectors 16B and 30B are set in the 2nd E unit 20B in response to a 2nd-E-unit operation beginning signal BOP2, and the 2nd E unit 20B generates an operation end signal EOP2 at the beginning of the final cycle of its operation.

In response to the application of the output pointer OP2 to a selector 29 in the 2nd I unit 22B, the selector 29 selects one of the outputs from the flip-flops 120 to 122. This selected signal indicates that the instruction to be executed is set in the register indicated by the output pointer OP2 among those of the instruction queue register 14. Therefore, the 1st I unit 22B generates the 2nd-E-unit operation beginning signal BOP2 on a line 52B only when both of the operation end signal EOP2 applied by way of the line 48B and the output signal applied from the selector 29 to an AND gate is in their "1" level. Finally, necessary information is set in the 2nd E unit 22B in this L2 stage in a manner as described below. The OP CODE, write register number $R_W$, 2nd-E-unit operation indication signals SUBGR, SUBCC and condition-code change indication signal CHGCC in the decoded information selected by the selector 16B are directly applied to the 2nd E unit 20B by way of the line 44B, while the read register number $R_R$ is applied to the 2nd general register 18B to be used for reading out the register operand RDATA2. This operand RDATA2 is applied to the 2nd E unit 20B by way of the line 46B. The memory operand MDATA2 selected by the selector 30B is applied directly to the 2nd E unit 20B by way of the line 45B. The 2nd E unit 20B receives this information in response to the operation beginning signal BOP2.

As shown in FIG. 6, the decoder 148 in the 2nd I unit 22B is actuated in response to the signal BOP2, and an output signal indicative of the counted-up value of the output pointer OP2 at that time is applied from the decoder 148 to the flip-flops 149 and 150. In this manner, the value of the output pointer OP2 is counted up each time the signal BOP2 is generated from the 2nd I unit 22B. Another decoder 113 is also actuated in response to the signal BOP2. This decoder 113 applies an output signal of "1" level to one of the OR gates 107 to 109 depending on the value of the output pointer OP2 at that time. In this case, the decode success signal DS is not applied to the decoder 100 or, even when the decode success signal DS is applied to the decoder 100, the value of the input pointer IP at that time differs from the value of the output pointer OP2. Therefore, no input signal of "1" level is applied from the decoder 100 to the data input terminal of the flip-flop 101, 102 or 103 corresponding to the value of the output pointer OP2. Consequently, one of the flip-flops 101, 102 and 103 corresponding to the output pointer OP2 is reset.

As assumed already, the decode success signal DS applied for execution of the D stage of the M instruction is generated at timing $C_o$, $T_2$ in FIG. 9A, and the value of the input pointer IP at that time is 2. Therefore, the flip-flop 103 is set at timing $C_1$, $T_o$, and the flip flop 122 is then set at timing $C_2$, $T_o$ which is delayed by one cycle from the timing $C_1$, $T_o$. According to the assumption, the value of the output pointer OP2 generated from the flip-flops 153 and 154 at this time must correspond to the M instruction to be executed in the L2 stage and is 2 in this case. Therefore, the output signal from the selector 129 is in its "1" level at timing $C_2$, $T_o$, and, since it is assumed that the 2nd E unit 20B has already completed execution of the operation according to the instruction X preceding the M instruction, the operation end signal EOP2 is in its "1" level. Therefore, the operation beginning signal BOP2 is also in its "1" level. In this manner, the data required for the execution of the M instruction is set in the 2nd E unit 20B, and the L2 stage of the M instruction is executed in the cycle $C_2$. The decoder 148 is actuated in response to the signal BOP2, and the value of the output pointer OP2 at that time is counted up to 0. The output pointer OP2 of this value is applied to the flip flops 149 and 150 at timing $C_2$, $T_2$ and is then applied to the flip-flops 153 and 154 at timing $C_3$, $T_o$. Therefore, in the cycle $C_3$, the value of the output pointer OP2 is changed to 0 for the execution of the A instruction succeeding the M instruction.

The decoder 113 is actuated at timing $C_2$, $T_o$ in response to the signal BOP2, and its output signal of "1" level is applied to the OR gate 109 corresponding to the value of the output pointer OP2 which is 2 at that time. Consequently, the flip-flop 103 is reset at timing $C_3$, $T_o$. This is because the value of the input pointer IP is changed to 1 at this time, and no input signal of "1" level is applied to the data input terminal of this flip-flop 103.

The L2 stage of the A instruction is executed in entirely the same manner as that above described, and the operation beginning signal BOP2 is generated in the cycle $C_3$ for the execution of this instruction. In the meantime, the value of the output pointer OP2 is changed to 0 at timing $C_3$, $T_o$ and is then changed to 1 at timing $C_4$, $T_o$.

As assumed already, there is an address conflict between the A instruction and the L instruction succeeding the A instruction. In such a case, the decode success signal DS applied for execution of this L instruction is generated at timing $T_2$ in the cycle $C_5$, and as a result execution of the L2 stage of the L instruction is deferred till the cycle $C_7$. Therefore, the value of the output pointer OP2 changed from 0 to 1 at the timing $C_4$, $T_o$ is maintained till the cycle $C_7$.

When the decode success signal DS applied for execution of the L instruction is generated at timing $C_5$, $T_2$, the flip-flop 102 is set at timing $C_6$, $T_o$. Then, the 2nd-E-unit operation beginning signal BOP2 is generated at timing $C_7$, $T_o$ for the execution of the L2 stage of the L instruction, in entirely the same manner as that described with reference to the M and A instructions.

[Details of E2 stage]

Figure 7:
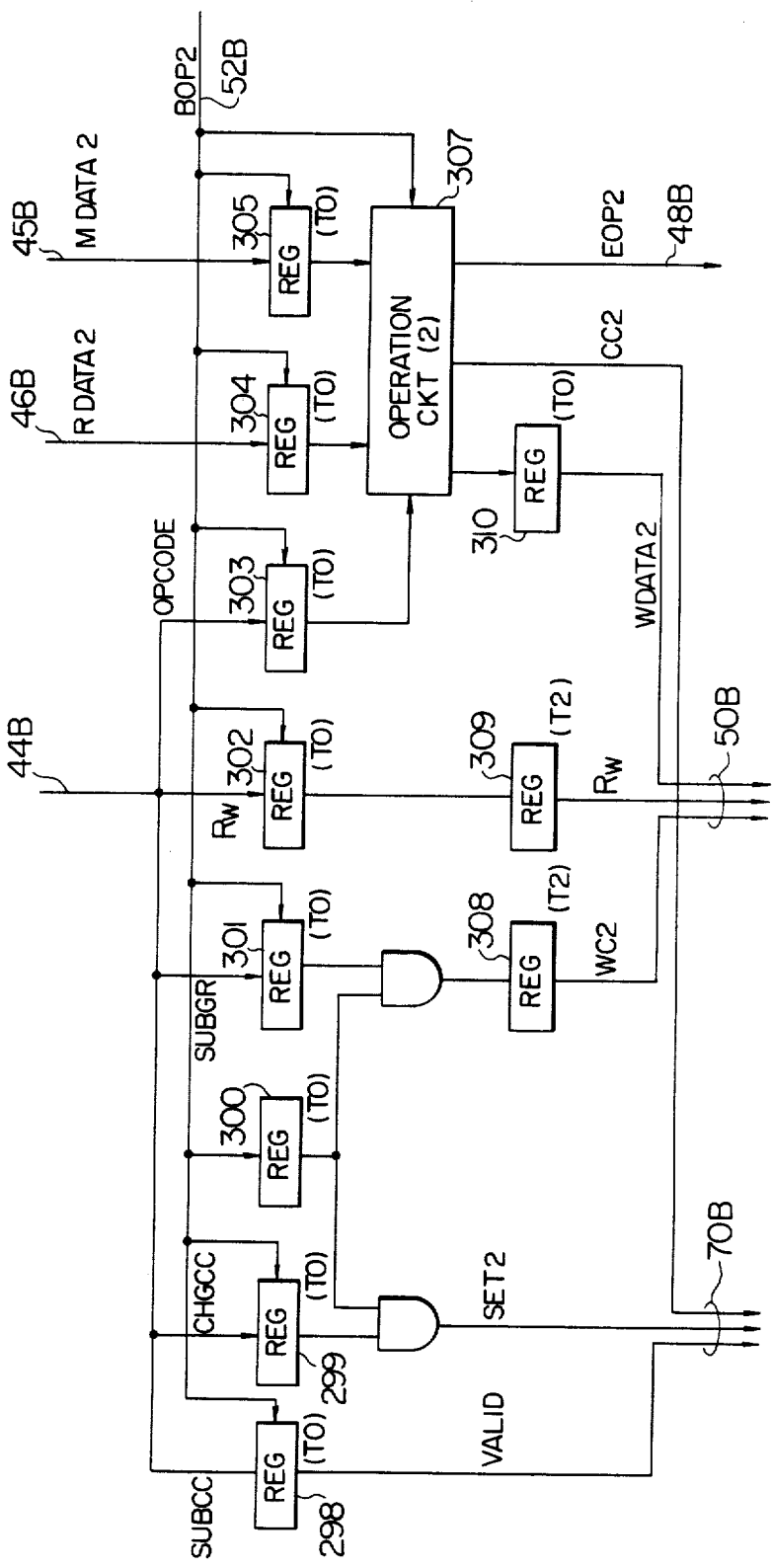
FIG. 7 shows schematically the structure of the second execution unit employed in the embodiment of the present invention.

As shown in FIG. 7, the 2nd-E-unit operation indication signal SUBCC, condition-code change indication signal CHGCC, 2nd-E-unit operation beginning signal BOP2, 2nd-E-unit operation indication signal SUBGR, write register number $R_W$, operation code OP CODE, register operand RDATA2 and memory operand MDATA2 are set in registers 298 to 305, respectively, in the 2nd E unit 20B in response to the application of the signal BOP2 by the execution of the L2 stage. A 2nd operation circuit 307 is actuated in response to the signal BOP2 to execute the operation specified by the OP CODE set in the register 303. The result of operation WDATA2 is applied from the circuit 307 to a register 310. When the OP CODE indicates an operation for changing the condition code, the 2nd operation circuit 307 generates the condition code CC2 depending on the resultant data WDATA2 and the OP CODE. The 2nd operation circuit 307 generates the operation end signal EOP2 at the end of the final cycle of the operation, and this signal EOP2 appears on the line 48B. This signal EOP2 is generated in each cycle until the operation beginning signal BOP2 is applied again. Even when the 2nd operation circuit 307 cannot execute the operation specified by the OP CODE the signal EOP2 appears from the circuit 307 in each cycle until the signal BOP2 is applied again. Since it is presently assumed that the 2nd operation circuit 307 is only capable of executing one machine cycle of operation, this signal EOP2 appears in each cycle.

The resultant data WDATA2 is set in the register 310 at timing $T_o$, and the write register number $R_W$ set in the register 302 is set in an associated register 309 at timing $T_2$. Similarly, the signals BOP2 and SUBGR set in the respective registers 300 and 301 are applied to an AND gate to set a register 308 at timing $T_2$. When an output signal of "1" level appears from the register 308, it provides a write signal WC2 which indicates that the resultant data WDATA2 is to be written in the 2nd general register 18B by way of the line 50B.

The output signal VALID from the register 298 indicates that the condition code CC2 is valid, and it is in its "1" level when the 2nd-E-unit operation indication signal SUBCC is in its "1" level and the L2 stage of an instruction has been executed. More precisely, the valid indication signal VALID is in its "1" level when the 2nd E unit 20B can execute the operation of the instruction and the instruction instructs changing of the condition code. Otherwise, this signal VALID is in its "0" level.

The output signal from the register 299 and that from the register 300 are applied to an AND gate. The output signal SET2 from this AND gate is in its "1" level in the E2 stage of the instruction instructing the changing of the condition code. Otherwise, this signal SET2 is in its "0" level. This signal SET2 is used for setting the condition code CC2 and valid indication signal VALID in the condition code register 34B shown in FIG. 1B.

Since the 2nd E unit 20B cannot execute the M instruction, the write signal WC2 remains in its "0" level in the case of the M instruction, and the outputs WDATA2 and CC2 from the 2nd operation circuit 307 have no meanings. Therefore, in the case of such an instruction, the E2 stage does not bring forth any significant result. This applies also to the L2 and P2 stages.

In the case of the A instruction, the 2nd operation circuit 307 executes the operation in the cycle $C_4$, and the resultant data WDATA2 and condition code CC2 appear on the line 50B at timing $C_5$, $T_o$. Also, the write register number $R_W$ and write signal WC2 appear on the line 50B at timing $C_4$, $T_2$. In the case of the L instruction too, the operation is similarly executed in the cycle $C_8$.

[Details of P2 stage]

The resultant data WDATA2 calculated in the manner above described in the E2 stage is applied from the 2nd E unit 20B to the 2nd general register 18B by way of the line 50B and is written in the register within the 2nd general register 18B indicated by the write register number $R_W$ when the write signal WC2 is in its "1" level.

Further, when the set indication signal SET2 is in its "1" level, the condition code CC2 and valid indication signal VALID are set in the condition code register 34B shown in FIG. 1B. The contents of this register 34B remain unchanged when the set indication signal SET2 is in its "0" level. Therefore, the contents of the condition code register 34B are renewed when the instruction whose E2 stage has been executed instructs changing of the condition code. Thus, when the 2nd E unit 20B can execute this instruction, the new contents of the condition code register 34B are the valid indication signal VALID of "1" level and the new condition code CC2 calculated in the 2nd E unit 20B. However, when the 2nd E unit 20B cannot execute this instruction, the new contents of the register 34B are the valid indication signal VALID of "0" level and the meaningless data appearing on the line 70B from the 2nd E unit 20B. On the other hand, when the instruction whose E2 stage has been executed does not instruct changing of the condition code, the contents of the register 34B are not renewed.

Therefore, the resultant data WDATA2 is written in the 2nd general register 18B at timing $C_5$, $T_2$ in the case of the A instruction, although this data writing is not done in the case of the M instruction, since the 2nd-E-unit operation indication signal SUBGR is in its "0" level. Further, in the case of the A instruction, the condition code CC2 and the valid indication signal VALID of "1" level are set in the condition code register 34B.

As described already, the P1 stage of the A instruction is executed in the cycle $C_9$. Therefore, when it is attempted to execute the L instruction utilizing the result of operation written in this P1 stage, the D stage of the L instruction must be started from the cycle $C_9$. However, by virtue of the fact that the 2nd E unit 20B executing the A instruction addition is provided separately from the 1st E unit 20A, the P2 stage of the A instruction can be executed in the cycle $C_5$. Therefore, the address conflict is removed at the end of the E2 stage (the cycle $C_4$) of the A instruction, and the output signal ACONF of "0" level appears from the address conflict detection circuit 32 (FIG. 1B) as described later, so that the 1st E unit 20A can now start execution of the D stage of the L instruction succeeding the A instruction. The D stage of the L instruction succeeding the A instruction can therefore be started in the cycle $C_5$. According to the embodiment of the present invention, therefore, execution of the D stage of the L instruction can be started in the cycle $C_5$ which is earlier by four cycles than the cycle $C_9$. The P2 stage of the L instruction is executed in the cycle $C_9$.

Detection of Address Conflict

Preceding instructions which are compared with an instruction set already in the instruction register 10 to detect an address conflict are classified into (1) an instruction which has been set already in the instruction queue register 14 for instructing renewal of the contents of the general registers and the operation of which has not yet been started and (2) an instruction which has already been set in the 1st E unit 20A from the instruction queue register 14 for instructing the renewal of the contents of the general registers and the operation of which has not yet been completed.

Figure 8:
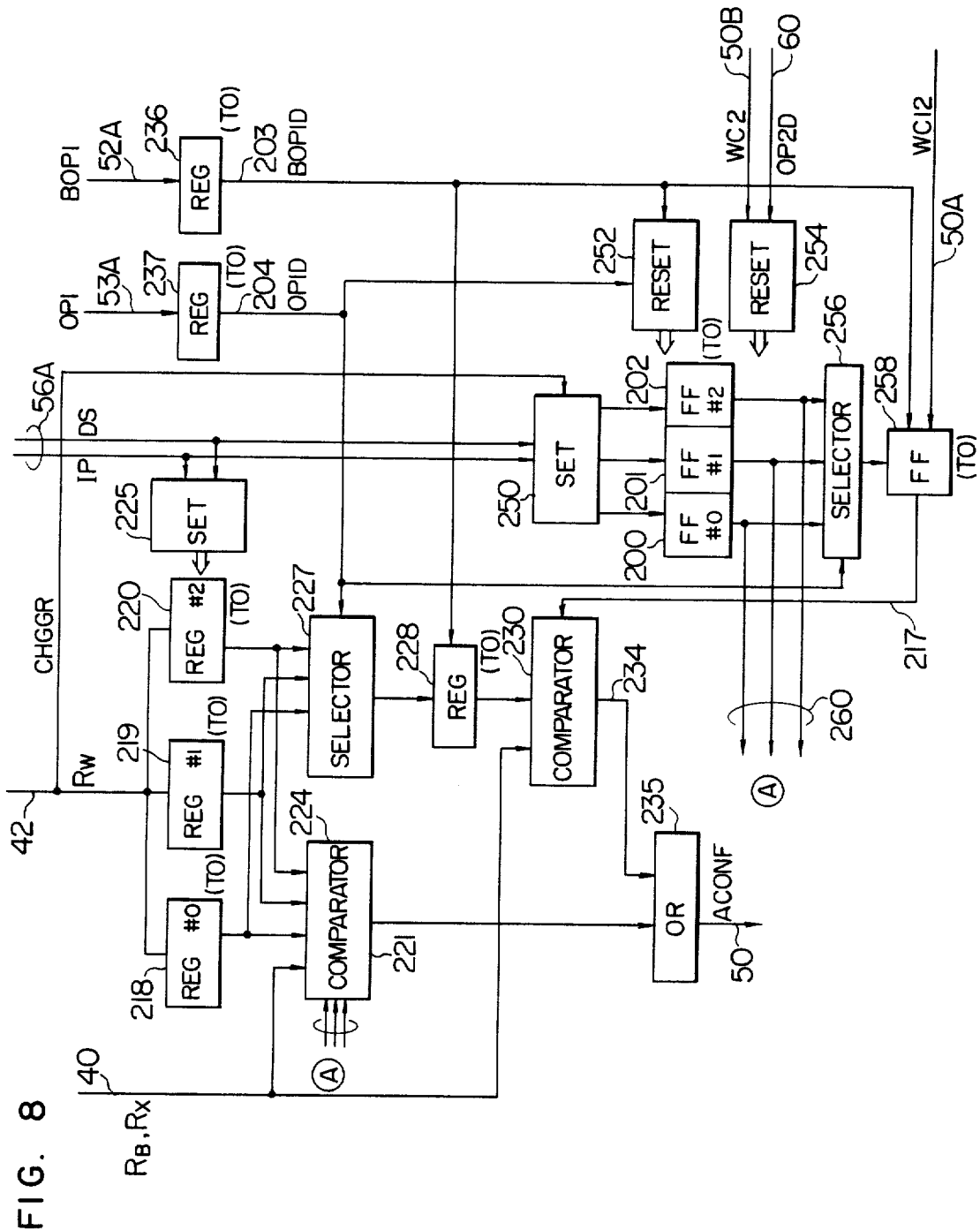
FIG. 8 shows schematically the structure of the address conflict detection circuit employed in the embodiment of the present invention.

Referring to FIG. 8, flip-flops 200, 201 and 202 are provided to indicate whether or not the decoded information registered in the instruction queue register 14 is obtained from the instruction belonging to the above classification (1). These flip-flops 200, 201 and 202 correspond to the No. 0, No. 1 and No. 2 registers respectively of the instruction queue register 14. The individual flip-flops 200 to 202 are set when the decoded information of instructions which change the general register is set in the corresponding registers of the instruction queue register 14, respectively, and are reset when the decoded information set in the corresponding registers of the instruction queue register 14 are then set in the 1st E unit 20A. That is, these flip-flops 200 to 202 is reset after completion of the L1 stage of the specific instruction, with the exception of the following case. That is, when the 2nd E unit 20B can execute the operation on the decoded information of the specific instruction, these flip-flops 200 to 202 are reset as soon as the result of operation of the specific instruction in the 2nd E unit 20B is written in the 2nd general register 18B, that is, when the P2 stage of the specific instruction is to be executed, even when the L1 stage of that instruction has not been completed yet. This is because, the contents of the 2nd general register 18B are used for calculating the memory operand address for the succeeding instruction, and the address conflict is removed as soon as the contents of the 2nd general register 18B are renewed, so that detection of the address conflict is no longer necessary even when the operation in the 1E unit 20A is not started yet. By virtue of this exception, execution of the D stage of the succeeding instruction can be expedited.

A set circuit 250 and reset circuits 252, 254 are provided so as to control the setting and resetting of the flip-flops 200 to 202 in the manner above described.

More precisely, when the register change indication signal CHGGR of "1" level is applied to the instruction decoder 12 by way of the line 42, the set circuit 250 sets one of the flip-flops 200 to 202 in response to the decode success signal DS and depending on the value of the input pointer IP. Thus, when decoded information of an instruction which change the general register is set in one of the registers of the instruction queue register 14, the corresponding one of the flip-flops 200 to 202 is set. The reset circuit 252 selectively resets these flip-flops 200 to 202 after completion of the L1 stage of the corresponding instruction. The 1st-E-unit operation beginning signal BOP1 used for instructing the beginning of the L1 stage of the specific instruction is applied by way of the line 52A to a register 236 to be latched thereby and a signal BOP1D delayed by one machine cycle from the signal BOP1 appears from the register 236 to be applied to the reset circuit 252 by way of a line 203. In response to this signal BOP1D, the reset circuit 252 selectively resets one of the flip-flops 200 to 202 specified by a pointer OP1D obtained by similarly delaying, by a register 237, the output pointer OP1 used in the L1 stage and applied from the register 237 by way of a line 204. The reset circuit 254 acts to exceptionally reset these flip-flops 200 to 202 after completion of the P2 stage of the specific instruction which can be executed by the 2nd E unit 20B. In response to the write signal WC2 generated from the 2nd E unit 20B upon completion of the E2 stage of the specific instruction for writing the result of operation in the 2nd general register 18B, the reset circuit 254 selectively resets one of the flip-flops 200 to 202 depending on the value of a pointer OP2D. This pointer OP2D is obtained by delaying by one machine cycle the output pointer OP2 used in the L2 stage, by flip-flops 155 and 156 shown in FIG. 6. This pointer OP2D applied by way of a line 60.

Registers 218, 219 and 220 are provided to register the write register numbers $R_W$ in the individual decoded information set in the instruction queue register 14. The decode success signal DS is applied together with the input pointer IP to a set circuit 225. Depending on the value of the input pointer IP applied at that time, the set circuit 225 selectively sets, in one of the registers 218 to 220, the write register number $R_W$ applied from the instruction decoder 12 by way of the line 42.

A comparator 224 is provided to detect the presence of an address conflict for the instruction belonging to the above classification (1). This comparator 224 detects coincidence between the address register number (the base register number $R_B$ and the index register number $R_X$) of the succeeding instruction set in the instruction register 10 and applied by way of the line 40 and the write register numbers $R_W$ set in the registers 218 to 220. However, the one corresponding to the set one of the flip-flops 200 to 202, among the registers 218 to 220, is only the object of this coincidence detection. The coincidence ouptut signal from this comparator 224 is applied as the address conflict detection signal ACONF to the 1st I unit 22A by way of a line 221, an OR gate 235 and the line 58 to be used for controlling beginning of the D stage of the succeeding instruction.

The manner of detection of an address conflict for the instruction belonging to the classification (2) will now be described.

A flip-flop 258 is set after the decoded information of the instruction instructing renewal of the contents of the general register are set in the 1st E unit 20A from the instruction queue register 14, that is, after execution of the L1 stage of the instruction. This flip-flop 258 is reset when the result of operation in the 1E unit 20A is written in the 2nd general register 18B, that is, prior to the execution of the P1 stage of the instruction. However, this flip-flop 258 is not set when the decoded information set in the 1st E unit 20A can also be processed by the 2nd E unit 20B. Thus, the output signal from a selector 256 selecting the outputs from the flip-flops 200 to 202 in response to the signal OP1D is applied to the flip-flop 258 to set this flip-flop 258 in response to the signal BOP1D, and the flip-flop 258 is reset in response to the write signal WC12 applied from the 1st E unit 20A after execution of the operation in the 1st E unit 20A for writing the result of operation in the 2nd general register 18B.

The reset circuit 252 resets one of the flip-flops 200 to 202 in response to the same signals BOP1D and OP1D as those described above. However, this reset circuit 252 is so designed that it operates after the flip-flop 258 is set.

On the other hand, a selector 227 selects one of the registers 218 to 220 in response to the signal OP1D, and the output from this selector 227 is set in a register 228 in response to the signal BOP1D. Therefore, the register 228 registers the write register number $R_W$ of the instruction being executed in the 1st E unit 20A. Another comparator 230 is actuated in response to the application of the set output from the flip-flop 258 to compare the write register number $R_W$ registered in the register 228 with the address register number $R_B$ and $R_X$ of the succeeding instruction applied by way of the line 40. When coincidence therebetween is detected, the comparator 230 applies the address conflict detection signal ACONF to the 1st I unit 22A by way of a line 234, the OR gate 235 and the line 58. In this manner, the process for detection of an address conflict for the instruction belonging to the classification (2) is completed.

As assumed already, the decode success signal DS is generated at timing $C_o$, $T_2$ in the case of the M instruction, and the value of the input pointer IP at that time is 2. Therefore, the flip-flop 202 is set at timing $C_1$, $T_o$, and the write register number $R_W$(M) of the M instruction is set in the register 220. When the A instruction secceeding the M instruction is set in the instruction register 10 at timing $C_1$, $T_o$, the comparator 224 compares the address register number $R_B$ and $R_X$ of this A instruction with the write register number $R_W$(M) registered in the register 220. Since there is no address conflict between the M and A instructions as assumed already, the address conflict detection signal ACONF is in its "0" level in the cycle $C_1$. In response to the signal ACONF of "0" level, the decode success signal DS for the A instruction is generated from the 1st I unit 22A at timing $C_1$, $T_2$. In response to this decode success signal DS, the write register number $R_W$(A) of the A instruction is set in the register 218 corresponding to the value, 0, of the input pointer IP, and the flip-flop 200 is set. Subsequently, the L instruction is set in the instruction register 10 at timing $C_2$, $T_o$. Since, as assumed already, the address register number $R_B$ or $R_X$ of the L instruction coincides with the write register number $R_W$(A) of the A instruction registered in the register 218, the address conflict detection signal ACONF of "1" level appears from the comparator 224 throughout the cycle $C_2$. Consequently, the decode success signal DS for the L instruction is not generated at timing $C_2$, $T_2$, and execution of the D stage of the L instruction is deferred.

On the other hand, the E2 stage of the A instruction is subsequently executed in the 2nd E unit 20B, and the write signal WC2 is generated from the 2nd E unit 20B at timing $C_4$, $T_2$. Although the value of the output pointer OP2 has already been changed to 1 at this time, the value of the pointer OP2D obtained by delaying the output pointer OP2 by one cycle is equal to 0 which is the value of the output pointer OP2 in the cycle $C_3$. Therefore, the reset circuit 254 acts to reset the flip-flop 200 at timing $C_5$, $T_o$. Consequently, the output signal ACONF of "0" level appears on the line 221 from the comparator 224. This means that the address conflict between the A and L instructions is now removed. Since, however, the E1 stage of the M instruction has not yet been completed at this timing, the D stage of the L instruction can be started only when there is no address conflict between the M instruction being executed and rhe L instruction which is the succeeding instruction. The comparator 230 detects this address conflict. More precisely, since the operation beginning signal BOP1 for the M instruction is generated at timing $C_2$, $T_o$, the flip-flop 258 is set and the flip-flop 202 is reset at timing $C_4$, $T_o$ in response to the signal BOP1D obtained by delaying the signal BOP1 by one cycle, and the write register number $R_W$ (M) of the M instruction having been set in the register 220 is now set in the register 228.

Therefore, after this timing $C_4$, $T_o$, the comparator 230 compares this write register number $R_W$ (M) with the address register number $R_B$, $R_X$ of the L instruction registered in the instruction register 10. Since there is no address conflict between the M and L instructions as assumed already, the output signal from the comparator 230 is in its "0" level after the cycle $C_4$. Therefore, the address conflict detection signal ACONF is in its "0" level after the timing $C_5$, $T_o$ at which the output signal from the comparator 230 turns into its "0" level. As a consequence, the 1st I unit 22A generates the decode success signal DS for the L instruction at timing $C_5$, $T_2$ so that the D stage of the L instruction begins from the cycle $C_5$.

Subsequently, the operation beginning signal BOP1 for the A instruction is generated at timing $C_7$, $T_o$, and the contents of the flip-flop 258 and register 228 are renewed at timing $C_9$, $T_o$. Then, the operation similar to that above described is executed for the L instruction.

Apparatus Operation Details-II

The parts of the apparatus and the operation thereof dealing with the presence of a condition code conflict will now be described in detail. For the purpose of explanation, it is assumed hereinafter that the instructions M, A and BC are executed in the above order, and the L instruction is executed when the branch is proven to be successful as a result of branch judgment by the BC instruction. It is also assumed that there is no condition code conflict between these instructions and their preceding instructions.

[Processing of BC instruction]

Figure 11A:
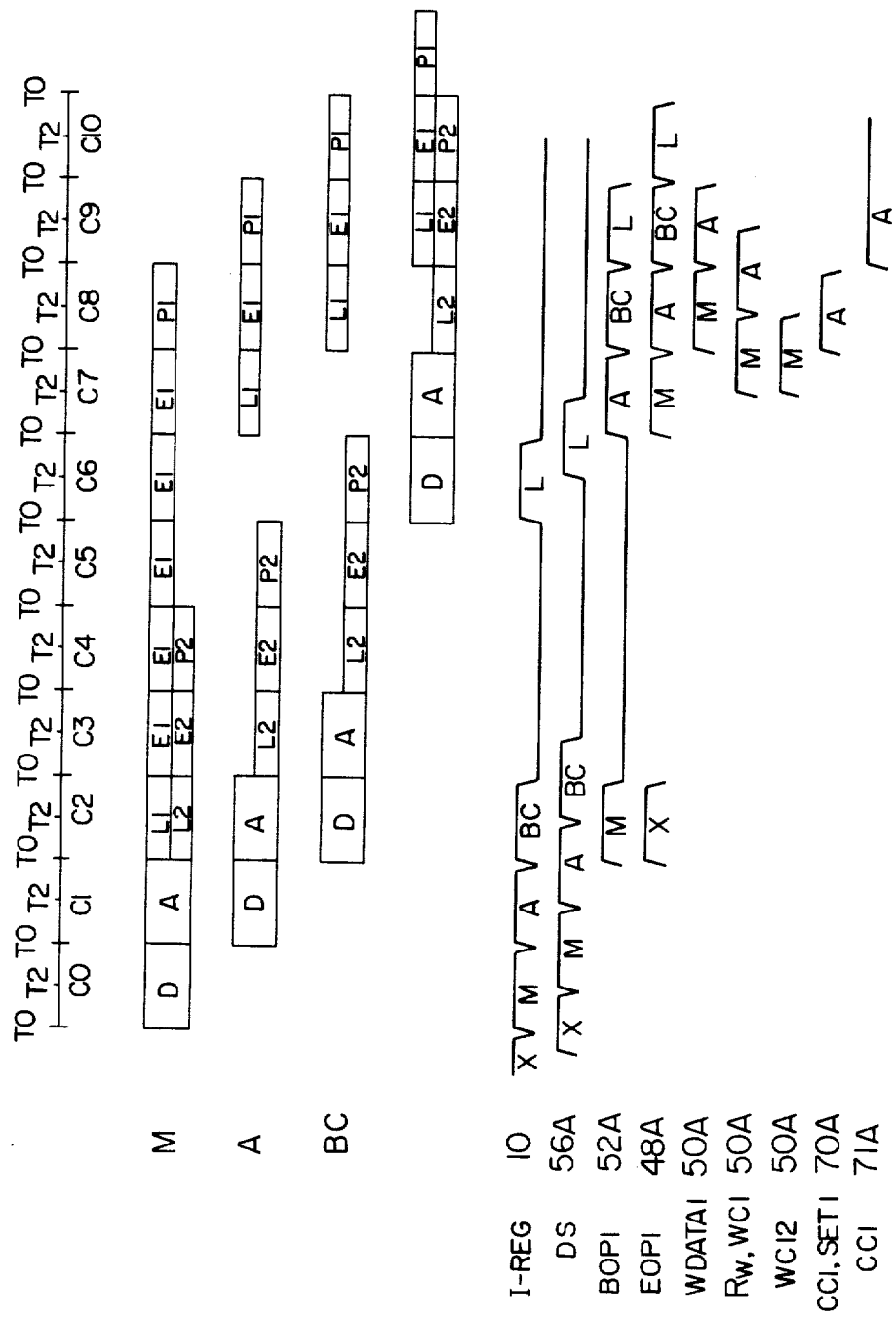
FIGS. 11A and 11B are timing charts illustrating the operation of the various parts of the embodiment in the presence of a condition code conflict.
Figure 11B:
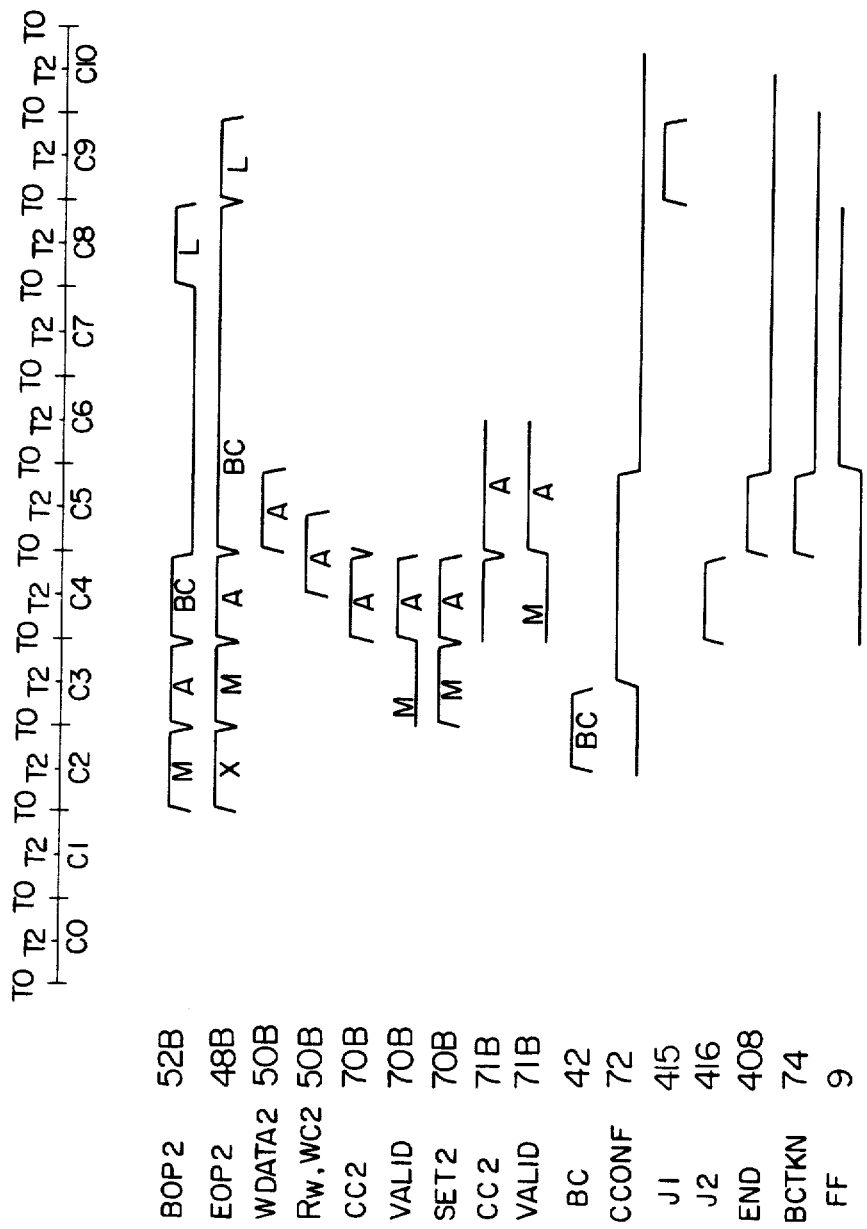

FIGS. 11A to 11C are timing charts illustrating the operation of the apparatus for processing the BC instruction. However, only those signals required for the understanding of the apparatus operation dealing with the presence of a condition code conflict are shown in FIGS. 11A to 11C for sake of simplicity.

It is assumed that the M and A instructions are executed in entirely the same manner as that described above, and the D stage of the BC instruction is executed in the cycle $C_2$.

In the D stage of the BC instruction, the address is calculated by the adder 24 as in the case of the M and A instructions, and this calculated address indicates that of the target instruction.

As in the case of other instructions, the information obtained by decoding the BC instruction by the decoder 12 are registered in the instruction queue register 14 in response to the decode success signal DS generated at timing $C_2$, $T_2$. The branch indication signal BC and mask signal MASK in the output from the decoder 12 are applied to the condition-code conflict detection circuit 36 by way of the line 42. As described later, the condition-code conflict detection circuit 36 generates a condition-code conflict detection signal CCONF of "1" level at timing $C_3$, $T_o$. In response to this signal CCONF, the 1st I unit 22A acts to restrain generation of the decode success signal DS for the succeeding instruction. This completes the D stage of the BC instruction. In the A stage of the BC instruction, the L instruction is read out from the main memory 26 at timing $C_3$, $T_o$ on the basis of the instruction address above described, and is stored at timing $C_4$, $T_o$ in the target stream-side of the instruction buffer 6A and 6B under control of the fetch circuit (not shown). Then, under control of the fetch circuit, the queue of instructions succeeding the L instruction are sequentially read out from the main memory 26 to be sequentially stored in the target stream-side of the instruction buffer 6A and 6B. For this purpose, the fetch circuit is so constructed that the branch indication signal BC from the decoder 12, the output signal from the adder 24 and the output signal from the flip-flop 9 are applied to the fetch circuit, as in the prior art apparatus, so that, when the branch indication signal BC is applied in the presence of the decode success signal DS of "1" level, the address information indicated by the output signal from the adder 24 at that time can be fetched. Subsequently, the fetch circuit acts to store the target instruction read out from the main memory 26 in the target stream-side of the instruction buffer 6A and 6B specified by the output from the flip-flop 9, and then sequentially counts up the instruction address, so that the instruction stream succeeding the target instruction can be sequentially read out from the main memory 26 on the basis of the address thus counted up. In this manner, the individual instructions of the target stream can be sequentially stored in one of the instruction buffers 6A and 6B.

In this A stage of the BC instruction, the target instruction read out from the main memory 26 is stored in the operand queue buffer 28 as in the case of other instructions. However, this target instruction which is not an operand is not utilized for operation in the 1st and 2nd E units 20A and 20B.

The operation of the A instruction in the 2nd E unit 20B is completed in the cycle $C_4$, and the operation end signal EOP2 is generated from this unit 20B in this cycle. Consequently, the operation beginning signal BOP2 is generated from the 2nd I unit 22B in this cycle $C_4$. Therefore, the L2 stage of the BC instruction can be executed in this cycle $C_4$.

In the L2 stage of the BC instruction, the decoded information of the BC instruction selected by the selector 16B are set in the 2nd E unit 20B. The operation required by the BC instruction is the judgment for branch success based on the decoded information. However, unlike the other instructions, this judgment is done in the condition-code conflict detection circuit 36 in the embodiment of the present invention. Therefore, the output from the selector 16B is applied by way of the line 44B to this detection circuit 36 to be set therein. The output from the selector 16B is applied also to the 2nd E unit 20B as in the case of other instructions.

Also, in this L2 stage, the selector 30B is so controlled as to select data relating to the BC instruction.

As described above, the condition-code conflict detection circuit 36 carries out the judgment for branch success in the stage succeeding the L2 stage. The 2nd E unit 20B does not substantially operate in this stage and acts to merely generate the operation end signal EOP2 in the cycle $C_5$. However, this stage is also referred to as the E2 stage as in the case of other instructions.

In this E2 stage, the condition-code conflict detection circuit 36 detects whether or not the branch success judgment on the basis of the output from the condition code register 34B is possible. The branch success judgment in the E2 stage becomes possible when the instruction preceding the BC instruction instructs changing of the condition code and can be executed in the 2nd E unit 20B. That is, the judgment is possible when the valid indication signal VALID appearing from the register 34B is in its "1" level. When the branch success judgment is possible, the condition-code conflict detection signal CCONF of "0" level appears at the end of the judgment. Further, when the result of judgment proves that the branch is successful, a branch success signal BCTKN appears on the line 74. On the other hand, when the branch success judgment is impossible, no change occurs in the level of the signal CCONF, and the signal BCTKN does not appear on the line 74.

Since, in the present case under consideration, the A instruction preceding the BC instruction can be executed by the 2nd E unit 20B and instructs changing of the condition code, the valid indication signal VALID of "1" level appears from the condition code register 34B after execution of the E2 stage of the A instruction by the 2nd E unit 20B. Therefore, the condition-code conflict detection circuit 36 recognizing that the branch success judgment is possible makes the branch success judgment in response to the condition code CC2 applied from the condition code register 34B and the mask signal MASK applied from the instruction decoder 12. When the result of judgment proves that the branch is successful, the branch success signal BCTKN of "1" level appears on the line 74 to invert the state of the flip-flop 9. The condition-code conflict detection signal CCONF turns into its "0" level at timing $C_6$, $T_o$. This completes the E2 stage of the BC instruction.

The following operation is done in the next stage called the P2 stage of the BC instruction. In this P2 stage, in response to the inversion of the stage of the flip-flop 9, the read circuit 8 sets the target instruction, that is, the L instruction in the instruction register 10 at timing $C_6$, $T_o$. Since the signal CCONF is now in its "0" level, and it is assumed that there is no address conflict, the 1st E unit 20A generates the decode success signal DS for the succeeding instruction at timing $C_6$, $T_2$. Thus, when the branch is successful, the D stage of the L instruction can be executed in the cycle $C_6$. After execution of the D stage of the BC instruction is started, an instruction to be executed when the branch is unsuccessful is set in the instruction register 10 by the function of the read circuit 8. Therefore, when the result of judgment proves that the branch is unsuccessful, the instruction set in the instruction register 10 to be executed in case of branch unsuccess is executed in response to the decode success signal DS, as in the prior art.

It will be apparent from the above description that the branch success judgment can be made in the cycle succeeding the cycle $C_4$ in which the 2nd E unit 20B has completed the execution of the E2 stage of the A instruction preceding the BC instruction. Therefore, even when the 1st E unit 20A is unable to execute the E1 stage of the A instruction because the 1st E unit 20A has not yet completed the operation according to the M instruction, the condition code obtained as a result of execution of the A instruction by the 2nd E unit 20B can be utilized to make the branch judgment for the BC instruction earlier than the prior art. That is, the condition code conflict can be removed earlier than the prior art. Consequently, the instruction succeeding the BC instruction can be executed earlier than in the prior art.

Since execution of the E1 stage of the A instruction is completed in the cycle 8, the L1, E1 and P1 stages of the BC instruction are executed in the cycles $C_8$, $C_9$ and $C_{10}$ respectively. In the L1 stage of the BC instruction, the outputs from the selectors 16A and 30A are set in the 1st E unit 20A as in the case of other instructions, but, in the E1 stage of the BC instruction, the 1st E unit 20A merely generates the operation end signal EOP1 without substantially executing any operation. On the other hand, when the branch success judgment in the E2 stage is impossible, the condition-code conflict detection circuit 36 makes the branch success judgment on the basis of the condition code CC1 generated from the condition code register 34A during the E1 stage of the BC instruction. At the end of this judgment, the condition-code conflict detection signal CCONF is turned into its "0" level, and, when the result of judgment proves that the branch is successful, the branch success signal BCTKN of "1" level appears. In the present case under consideration, the branch success judgment has been possible in the E2 stage of the BC instruction, and the circuit 36 does not make any significant operation for such judgment.

[Branch judgment]

Figure 10:
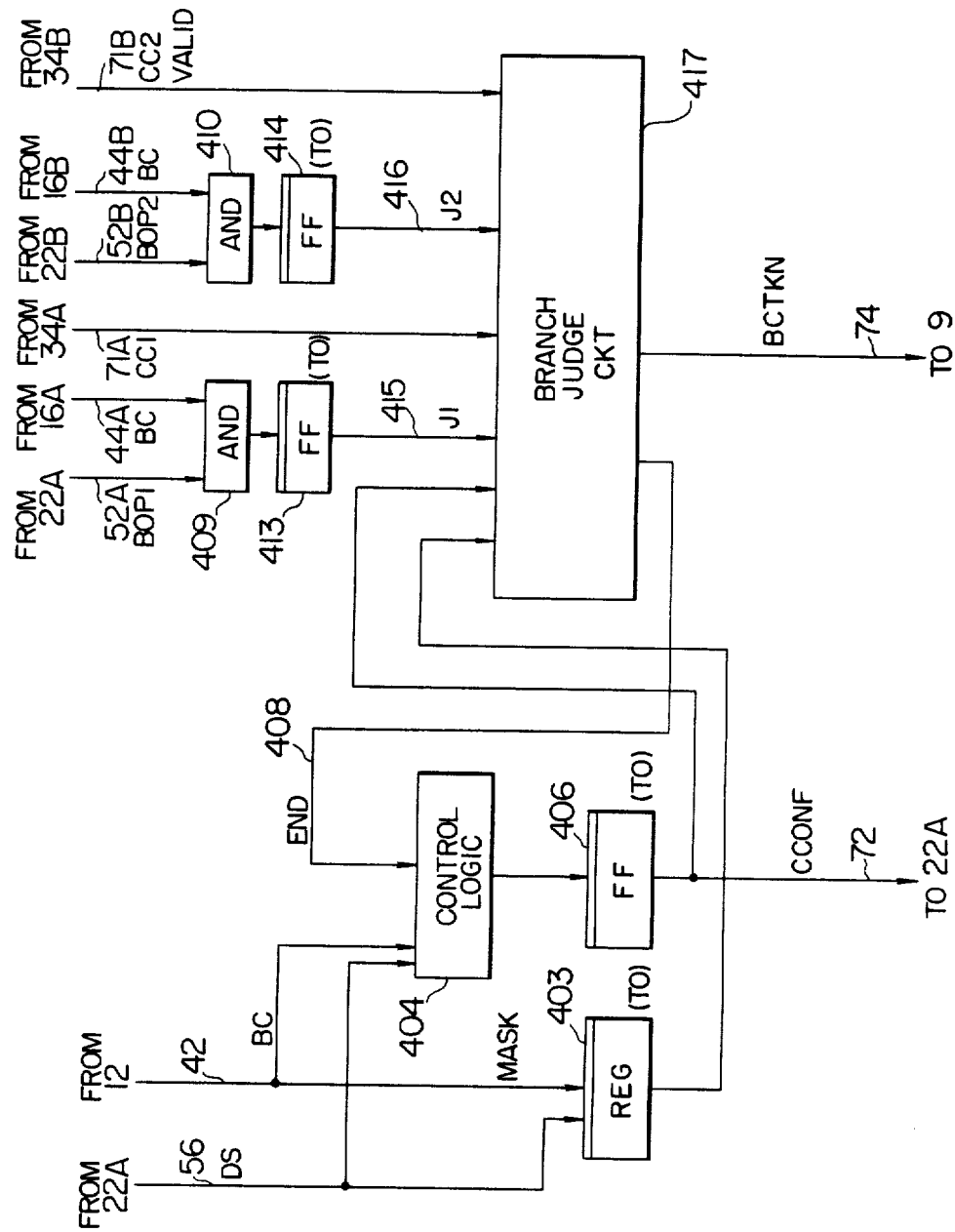
FIG. 10 shows schematically the structure of the condition-code conflict detection circuit employed in the present invention.

Referring to FIG. 10, the mask signal MASK applied from the instruction decoder 12 by way of the line 42 is set in a register 403 at timing $T_o$ in response to the decode success signal DS applied from the 1st I unit 22A by way of the line 56A. Since it is now assumed that the BC instruction is set in the instruction register 10 at timing $C_2$, $T_o$, the mask signal MASK for the BC instruction appears at timing $C_3$, $T_o$ from the register 403. The output from a flip-flop 406 is used as the condition-code conflict detection signal CCONF which appears on a line 72. In response to the application of the decode success signal DS from the 1st I unit 22A together with the BC indication signal BC, a control logic 404 sets the flip-flop 406, and in response to the application of a branch judgment end signal END from a branch judgment circuit 417 by way of a line 408, the control logic 404 resets the flip-flop 406. Since the signals BC and DS are applied to the control logic 404 at timing $C_2$, $T_o$ and timing $C_2$, $T_2$ respectively in this case, the condition-code conflict detection signal CCONF of "1" level appears from the flip-flop 406 at timing $C_3$, $T_o$. Thus, as described already, the 1st I unit 22A acts to inhibit appearance of the decode success signal DS for the succeeding instruction. The branch judgment circuit 417 judges whether or not the condition code CC1 applied from the condition code register 34A by way of a line 71A or the condition code CC2 applied from the condition code register 34B by way of a line 71B satisfies the branch condition indicated by the mask signal MASK applied from the register 403. This judgment is made at the timing at which an output signal $J_1$ or $J_2$ of "1" level appears from a flip-flop 413 or 414. The flip-flop 413 is set when the BC indication signal BC and 1st-E-unit operation beginning signal BOP1 are simultaneously applied to an AND gate 409 from the selector 16A and 1st I unit 22A by way of the lines 44A and 52A respectively, that is, when the L1 stage of the BC instruction is executed. Consequently, the output signal $J_1$ of "1" level appears from the flip-flop 413 in the E1 stage of the BC instruction. Similarly, the flip-flop 414 is set when the BC indication signal BC and 2nd-E-unit operation signal BOP2 are simultaneously applied to an AND gate 410 from the selector 16B and 2nd I unit 22B by way of the lines 44B and 52B respectively, that is, when the L2 stage of the BC instruction is executed. Consequently, the output signal $J_2$ of "1" level appears from the flip-flop 414 in the E2 stage of the BC instruction. Thus, the branch success judgment is made in the E1 or E2 stage of the BC instruction. The branch success judgment can be made in the E2 stage of the BC instruction when the valid indication signal VALID generated from the condition code register 34B is in its "1" level. As described already, the contents of the condition code register 34B are renewed each time the E2 stage of the instruction instructing changing of the condition code is completed. When such an instruction can be executed by the 2nd E unit 20B, the output signal VALID of "1" level appears from the condition code register 34B. Otherwise, the signal VALID is in its "0" level. Therefore, the fact that the valid indication signal VALID of "1" level appears from the condition code register 34B in the E2 stage of the BC instruction indicates that the condition-code changing instruction executed most recently prior to the BC instruction is that which can be executed by the 2nd E unit 20B. Therefore, when the valid indication signal VALID of "1" level is applied from the condition code register 34B to the branch judgment circuit 417, the branch success judgment can be made on the basis of the condition code CC2 applied from the register 34B. On the other hand, the fact that the valid indication signal VALID is in its "0" level indicates that the condition-code changing instruction executed most recently before the BC instruction cannot be executed by the 2nd E unit 20B. In such a case, it is necessary to make the branch success judgment in the E1 stage of the BC instruction. Therefore, the branch judgment circuit 417 generates the branch judgment end signal END according to the following logical expression:

$$END = CCONF \times (J_1 + VALID \times J_2)$$

The cross and plus signs represent the logical product and logical sum respectively. Therefore, when the branch success judgment has been completed in the E2 stage and, as a result of the judgment completion, the end signal END has been turned into its "1" level, the signal CCONF is then turned into its "0" level. Therefore, the signal END turns into "0" level. It does not turn in its "1" level in the succeeding E1 stage.

In the present case under consideration, the A instruction preceding directly the BC instruction is the condition-code changing instruction that can be executed by the 2nd E unit 20B, and the signal VALID is in its "1" level in the E2 stage of the BC instruction. Therefore, the branch success judgment for this BC instruction is made in the E2 stage. As a consequence, the end signal END turns into its "1" level at timing $C_5$, $T_o$, and the output signal CCONF from the flip-flop 406 turns into its "0" level at timing $C_6$, $T_o$.

When the end signal END turns into its "1" level, the branch judgment circuit 417 compares the condition code with the mask signal MASK applied from the register 403 to judge whether or not the branch is successful. The condition codes CC2 and CC1 are used for this comparison in the E2 and E1 stages, respectively, of the BC instruction. The manner of branch success judgement is similar to that employed in the prior art. For example, when the mask signal MASK is composed of 4 bits, the condition code CC2 or CC1 is composed of 2 bits. The branch is judged to be successful when the bit of the mask signal MASK in the 4-bit digit position corresponding to the decimal number represented by this condition code of 2 bits is a "1".

Both of the branch judgment end signal END and the branch success signal BCTKN turn into their "1" level when the branch is judged to be successful. In the case now under consideration, the branch success signal BCTKN turns into "1" level in the cycle $C_5$.

The branch success judgment is made in the manner above described, and execution of the D stage of the succeeding instruction is started from the cycle $C_5$ at the end of which the condition-code conflict detection signal CCONF turns into its "0" level.

In the embodiment, the condition-code conflict detection circuit 36 is provided separately from the 1st and 2nd E units 20A, 20B, but parts of the circuit 36 which relate to branch success judgment at E1 and E2 stages of the BC instruction can be incorporated into the 1st and 2nd E units 20A, 20B, respectively. Therefore, these parts can be regarded as parts of the 1st and 2nd E units 20A, 20B, respectively.

It will be understood from the foregoing detailed description of the present invention that, before the first execution unit begins execution of operation of an instruction, the second execution unit can begin execution of operation of that instruction. The present invention is therefore advantageous in that execution of the succeeding instruction which utilizes the result of operation of the preceding instruction can be expedited to effectively increase the data processing speed.

We claim:

1. A data processing apparatus executing a plurality of instructions in a pipeline mode by dividing each of the instructions into a plurality of stages, said apparatus comprising:

means for controlling execution of instructions;
means for sequentially decoding executable instructions to produce data required for execution of individual instructions;
means for storing a queue of data produced as a result of decoding of a plurality of instructions;
first execution means for executing operations required by all of said plural instructions; and
second execution means for executing operations required by part of said plural instructions
wherein said control means includes:
means connected to said storing means for sequentially selecting the data corresponding to a succeeding instruction from said storing means in synchronism with the end of operation of a preceding instruction in said first execution means to supply the selected data to said first execution means;
means connected to said storing means for sequentially selecting the data corresponding to a suceeding instruction from said storing means in synchronism with the end of operation of a preceding instruction in said second execution means to supply the selected data to said second execution means;
means responsive to said decoding means for detecting for each of said instructions whether or not the result of operation of the preceding instruction is to be utilized in a predetermined stage of the succeeding instruction; and
means connected to said detecting means for inhibiting, when the result of detection is affirmative, the execution of the predetermined stage of said succeeding instruction until said first or second execution means completes the operation of said preceding instruction.

2. A data processing apparatus of claim 1, wherein said detecting means detects for each of said instructions whether or not the result of operation of said preceding instruction is to be utilized for calculation of an operand address in a stage of calculation of said operand address required for the operation of each of said instructions.

3. A data processing apparatus of claim 1, wherein said detecting means detects for each of said instructions whether or not a branch instruction is successful by utilizing a condition code determined as a result of operation of said preceding instruction.

* * * * *